(12) United States Patent
Kimura et al.

(10) Patent No.: US 12,727,972 B2
(45) **Date of Patent: *Sep. 8, 2026**

(54) METHODS OF FORMING ARCH ADJUSTMENT DENTAL APPLIANCES

(71) Applicant: Align Technology, Inc., San Jose, CA (US)

(72) Inventors: Ryan Kimura, San Jose, CA (US); John Morton, San Jose, CA (US); Richard Shaw, Morgan Hill, CA (US); Chunhua Li, Cupertino, CA (US)

(73) Assignee: Align Technology, Inc., San Jose, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 18/465,154

(22) Filed: Sep. 11, 2023

(65) Prior Publication Data

US 2023/0414325 A1 Dec. 28, 2023

Related U.S. Application Data

(60) Continuation of application No. 18/353,048, filed on Jul. 14, 2023, which is a continuation of application No. 16/659,442, filed on Oct. 21, 2019, now Pat. No. 11,744,677, which is a division of application No.

(Continued)

(51) Int. Cl.

| | |
|---|---|
| ***A61C 7/10*** | (2006.01) |
| ***A61C 7/00*** | (2006.01) |
| ***A61C 7/08*** | (2006.01) |

(52) U.S. Cl.
CPC ................ *A61C 7/10* (2013.01); *A61C 7/002* (2013.01); *A61C 7/08* (2013.01)

(58) Field of Classification Search
CPC .............. A61C 7/08; A61C 7/10; A61C 7/002
See application file for complete search history.

(56) References Cited

U.S. PATENT DOCUMENTS

| | | |
|---|---|---|
| 2,750,941 A | 6/1956 | Cathcart |
| 3,792,529 A | 2/1974 | Goshgarian |
| 4,197,644 A | 4/1980 | Ackerman, Jr. |

(Continued)

FOREIGN PATENT DOCUMENTS

| | | |
|---|---|---|
| CN | 105726143 A | 7/2016 |
| WO | 2006004541 A1 | 1/2006 |
| WO | 2017105117 A2 | 6/2017 |

*Primary Examiner* — Nicholas D Lucchesi
(74) *Attorney, Agent, or Firm* — Shay Glenn LLP

(57) ABSTRACT

Methods of forming dental appliances. A virtual arch element may be formed using a virtual dental arch of a patient. The virtual arch element may be wider than an arch width across the virtual dental arch. One or more virtual tooth engagement structures connected to the virtual arch element may be formed. The virtual tooth engagement structure(s) may be configured to engage with teeth on opposing sides of the virtual dental arch. The virtual arch element may extend from a lingual side of the virtual tooth engagement structure (s) so that, when the virtual tooth engagement structure(s) are engaged with the teeth, the virtual arch element spans across the palate and the virtual arch element and the virtual tooth engagement structure(s) applies a virtual force on the teeth on opposing sides of the virtual dental arch in accordance with a stage of a treatment plan.

25 Claims, 16 Drawing Sheets

Related U.S. Application Data

14/850,305, filed on Sep. 10, 2015, now Pat. No. 10,449,016.

(60) Provisional application No. 62/052,893, filed on Sep. 19, 2014.

(56) References Cited

U.S. PATENT DOCUMENTS

| | | | | |
|---|---|---|---|---|
| 4,431,411 | A | 2/1984 | Witzig et al. | |
| 4,919,612 | A | 4/1990 | Bergersen | |
| 6,257,239 | B1 | 7/2001 | Kittelsen et al. | |
| 6,491,519 | B1 | 12/2002 | Clark et al. | |
| 11,666,415 | B2 | 6/2023 | Wang et al. | |
| 2004/0013993 | A1 | 1/2004 | Ito | |
| 2008/0050692 | A1* | 2/2008 | Hilliard .................... | A61C 7/08 433/24 |
| 2009/0239188 | A1 | 9/2009 | Ting et al. | |
| 2012/0017918 | A1 | 1/2012 | Huang et al. | |
| 2014/0326253 | A1 | 11/2014 | Baratier et al. | |
| 2016/0256240 | A1 | 9/2016 | Shivapuja et al. | |
| 2016/0270883 | A1 | 9/2016 | Yousefian | |
| 2018/0333224 | A1 | 11/2018 | Van Esbroeck et al. | |

* cited by examiner 302
304
300

METHODS OF FORMING ARCH ADJUSTMENT DENTAL APPLIANCES

CROSS REFERENCE TO RELATED APPLICATIONS

This application is a continuation of U.S. patent application Ser. No. 18/353,048, filed Jul. 14, 2023, now U.S. Patent Application Publication No. 2023/0355353; which is a continuation of U.S. patent application Ser. No. 16/659,442, filed Oct. 21, 2019, now U.S. Pat. No. 11,744,677, which is a divisional of U.S. patent application Ser. No. 14/850,305, filed Sep. 10, 2015, now U.S. Pat. No. 10,449,016, which claims priority from U.S. Provisional Patent Application No. 62/052,893, filed Sep. 19, 2014, each of which is incorporated herein by reference in its entirety for all purposes.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

The present disclosure is related generally to the field of dental treatment. More particularly, the present disclosure is related to methods, systems, and devices for adjusting an arch of a patient.

Dental treatments may involve, for instance, restorative and/or orthodontic procedures. Restorative procedures may be designed to implant a dental prosthesis (e.g., a crown, bridge inlay, onlay, veneer, etc.) intraorally in a patient. Orthodontic procedures may include repositioning misaligned teeth and/or changing bite configurations for improved cosmetic appearance and/or dental function. Orthodontic repositioning can be accomplished, for example, by applying controlled forces to one or more teeth over a period of time.

As an example, orthodontic repositioning may be provided through a dental process that uses positioning appliances for realigning teeth. Such appliances may utilize a thin shell of material having resilient properties, referred to as an "aligner," that generally conforms to a patient's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement.

Such systems typically utilize materials that are lightweight and/or transparent to provide a set of appliances that can be used serially such that as the teeth move, a new appliance can be implemented to further move the teeth toward the desired goal.

In some instances, the width of a dental arch of a patient's upper dentition and/or and a width of a dental arch of a patient's lower dentition can be insufficient (e.g., too narrow) and on rare occasions, the width may be excessive (e.g., Brodie bite). A dental arch that is insufficient can result in malocclusions such as crossbite, crowding of teeth, impacted teeth, and/or the patient's smile may not be aesthetically pleasing in appearance. For instance, a patient's smile may be "narrow", resulting in a sunken appearance in the buccal corridors due to the inability to see the back teeth from the front view.

In certain types of front-to-back bite correction (e.g., Class II and Class III correction), a need for transverse width correction exists, without which the upper and lower arches will not be properly coordinated. For Class II correction, the upper needs to be expanded so that when the lower is advanced, the teeth in the buccal regions (typically the bicuspids and molars) are fitting together correctly in the buccal-lingual dimension. For Class III correction, the reverse is required, and the lower needs to be expanded since it is usually the one that has compensated for the Class III bite by constricting. When both Class II and Class III are corrected to a more ideal Class I bite, the respective compensations need to be undone, and a transverse width dimension of movement is necessary in addition to the anterior-to-posterior movement.

There are several ways in which the arch of a patient can be expanded. For example, palatal expansion expands the upper jaw of the patient by spreading the maxilla. In some situations, the teeth of the upper and/or lower jaw can be moved or angled outward thereby expanding the width of the arch of the patient. This technique can be referred to as dental expansion. Further, expansion of the lower arch in this manner is often referred to as mandibular expansion.

In young patients, the midpalatal suture has not fused the left and right maxillary palates together and therefore, the movement of the plates with respect to each other can be accomplished more easily and with less force than in older patients. When the fusing of the suture is new, it may still be possible to split the suture apart.

For example, currently available orthodontic appliances can include a jackscrew and/or other mechanism that is employed to deliver a horizontal stretching force to the molar teeth to split the upper jaw of the patient along the midpalatal suture. Such a mechanism typically spreads the left and right maxillary plates of the palate apart and then new bone material grows in between to fill the gap. As such, a large horizontal force (e.g., 10 to 50 Newtons (N) with cumulative loads reaching 40 to 150 N across the suture) is applied during a short period, in many cases. The insertion of such a mechanism is typically accomplished by a treatment professional and can cause discomfort and/or pain for a patient.

In some instances, the screw and/or other mechanism can be employed incrementally one or more times a day (e.g., 0.25 mm expansion twice a day—one activation in the morning and once at night). For example, a pinhole can be present in the orthodontic appliance and a patient can insert an activation key into the pinhole to incrementally increase a distance between portions of the orthodontic appliance.

Such orthodontic appliances can be difficult for a patient to use, and often require assistance from another person (e.g., a parent) to turn the key. Not only are such appliances often not aesthetically pleasing, they often times interfere with the patient's speech, temporarily affect their ability to chew and/or swallow, and/or can be painful when activated.

Adding to the challenges of such an appliance is the need to retain the expansion while the bone is filling into the suture, long after the active expansion has taken place. The active expansion process may be completed within 2 or 3 weeks' time, but the retention period can last around 6 months while waiting for the gap between the maxillary halves to fill in with new bony tissue.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
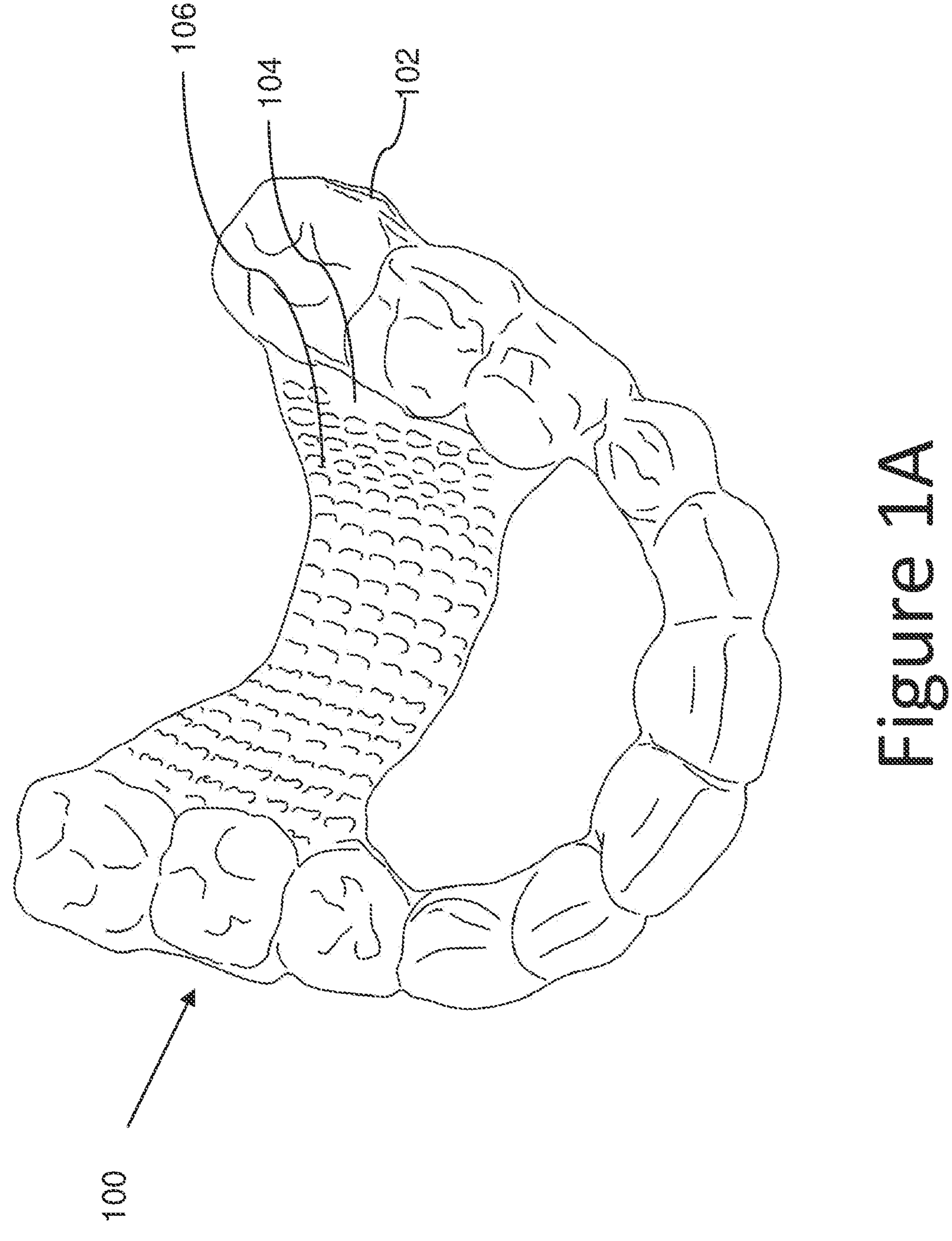
FIG. 1A illustrates an example of an appliance having a structural reinforcement feature provided thereon according to a number of embodiments of the present disclosure.

As discussed above, the present disclosure provides methods, systems, and devices for expanding an arch of a patient. Generally, dental and/or skeletal expansion occurs during an orthodontic treatment which is a process of moving and reorienting teeth for functional and/or aesthetic purposes, although repositioning may be made for other purposes.

In some instances, an arch of a patient's teeth can be insufficient (e.g., narrow), and in rare occasions, too wide. An insufficient arch of a patient's teeth can cause overcrowding of a patient's teeth, impacted teeth, speech difficulty, breathing issues, and/or the smile of a patient can be aesthetically unpleasing. As such, an orthodontic treatment plan can include an arch expansion component and such a process typically occurs in an early stage of the plan in order to provide more room for the teeth to be arranged.

A narrow arch also prevents the anterior-posterior bite relationship from being corrected properly. An arch of teeth, as used herein, can include a curved row of teeth on a particular jaw of a patient. An insufficient arch can include an arch that has a width too narrow to support the row of teeth in a correct alignment, for instance. The arch width of a patient's teeth can be expanded, for instance, using an orthodontic appliance (e.g., a dental appliance).

As discussed above, patients that are children or teenagers may have a maxilla where the midpalatal suture has not yet fused. Usually in the mid to late teens, the palatal suture fuses and the halves of the maxilla join together to become a single maxillary bone.

The maxilla (e.g., the upper jaw) is a bone that is fixed to the skull and forms the palate of the patient. The mandible (e.g., lower jaw) is a bone that is also attached to the skull by numerous muscles which power its movement. The mandible articulates at its posterior upward extremities with the temporal bone to form the jaw joint. The jaw joint is a loosely connected joint that accommodates the variety of movements of the mandible relative to the maxilla during biting and chewing.

In correctly shaped and positioned jaws, the upper teeth occupy an arch that is wider than the arch comprising the lower teeth. In other words, the upper teeth are designed to be buccally positioned relative to the teeth in the lower jaw. Malocclusions, such as crossbite, occur when this normal arrangement is reversed and one or more of the upper teeth are positioned lingual to the teeth in the lower jaw.

A patient with an un-fused maxilla can, for instance, have their palate skeletally expanded. This is in contrast to dental expansion where the teeth are uprighted or moved within the boundaries of the jaw in which they are contained. With skeletal expansion, the underlying bone is moved and the teeth are moved along with the changes to the shape of the bone.

Expanding a palate can, for instance, include splitting the left and right sides of the maxilla so that the teeth on the upper left side move as a single unit relative to the teeth on the right side. Because of this phenomenon, a gap between the top two front teeth can open up during the expansion process if they are not restrained from separating.

As discussed above, expansion of the palate, such as those methods performed prior to an orthodontic treatment involving braces and wires, currently includes having a treatment professional place an orthodontic appliance that may include anchoring bands, support bars, springs, and/or jack screws. The appliance is firmly affixed to the teeth at the anchor points and the springs or jackscrew applies forces on the teeth in order to move the underlying portions of the palate of the patient, thereby causing the arch of the patient's dentition to widen.

To adjust the appliance and increase the amount of expansion, the patient and/or another person must insert a key into the pinhole and turn the key to increase the width of the orthodontic appliances. In some examples, prior approaches can include a removable appliance which contains a jackscrew expander that is activated with a pinhole key.

After expanding the arch of the patient to the desired width (and sometimes overcorrecting in order to anticipate potential relapse toward the narrowness initially present), further orthodontic treatment can be performed to move and re-orient the teeth of the patient. This type of additional orthodontic treatment is typically performed after the expansion phase and a retention period where the jaw position is stabilized for a period of time while the musculature and bone adjust to the new positioning.

Further, palate expansion devices that are used primarily for skeletal expansion are typically temporarily anchored to the molars and/or pre-molars of the patient for the duration of the expansion and cannot be removed except by a dental professional because they are cemented into place. The forces that are applied to the molars and/or premolars are rather high in order to separate the suture during a short time period (e.g., one or more days), and therefore, the treatment can be uncomfortable to the patient due to the high pressure that is generated during the activation period. Once the suture splits, the majority of the pressure is relieved and subsequent activations in close proximity to the initial activation are not as uncomfortable.

In contrast, expanding an arch of a patient (whether skeletally with a fixed appliance or dentally with a removable appliance) according to embodiments of the present disclosure, can include utilizing a set of one or more appliances, such as positioners, retainers, and/or other removable appliances (e.g., clear plastic polymer shells and/or aligners) having a shell to be worn over the teeth of a patient and having an arch element thereon that is designed to expand an arch of teeth of the patient by: moving the teeth of the patient to a wider position within the jaw, by expanding the palate of the patient, or a combination of the two. As indicated, some embodiments discussed herein may also expand the palate to a degree, but the dental expansion is much more gradual (e.g., on the order of 0.5 mm per month as opposed to 0.5 mm per day).

Palatal expansion may be accomplished, for example, in patients where the midpalatal suture has not fused. Additionally, some embodiments may be able to un-fuse the suture, in some patients.

One or more appliance embodiments can include a removable shell formed of a first material having a number of cavities therein, wherein the cavities are shaped to receive teeth of the patient. These appliances are not fixed to the teeth of the patient and therefore can be removed by the patient for periods of time during treatment without aid from other people or intervention by a treatment professional.

Figure 7:
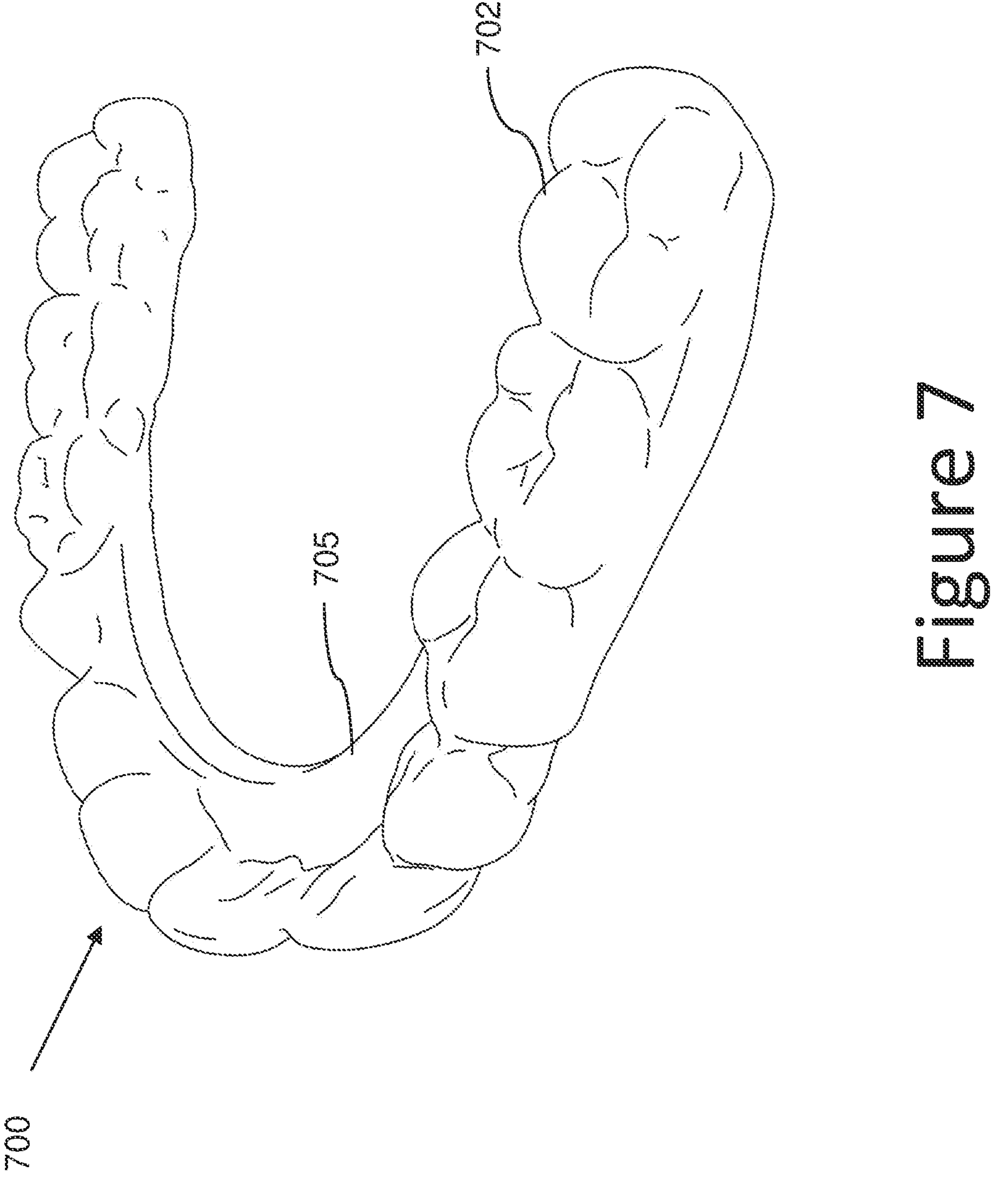
FIG. 7 illustrates an example of an appliance having an anterior tab arch element according to a number of embodiments of the present disclosure.
Figure 9:
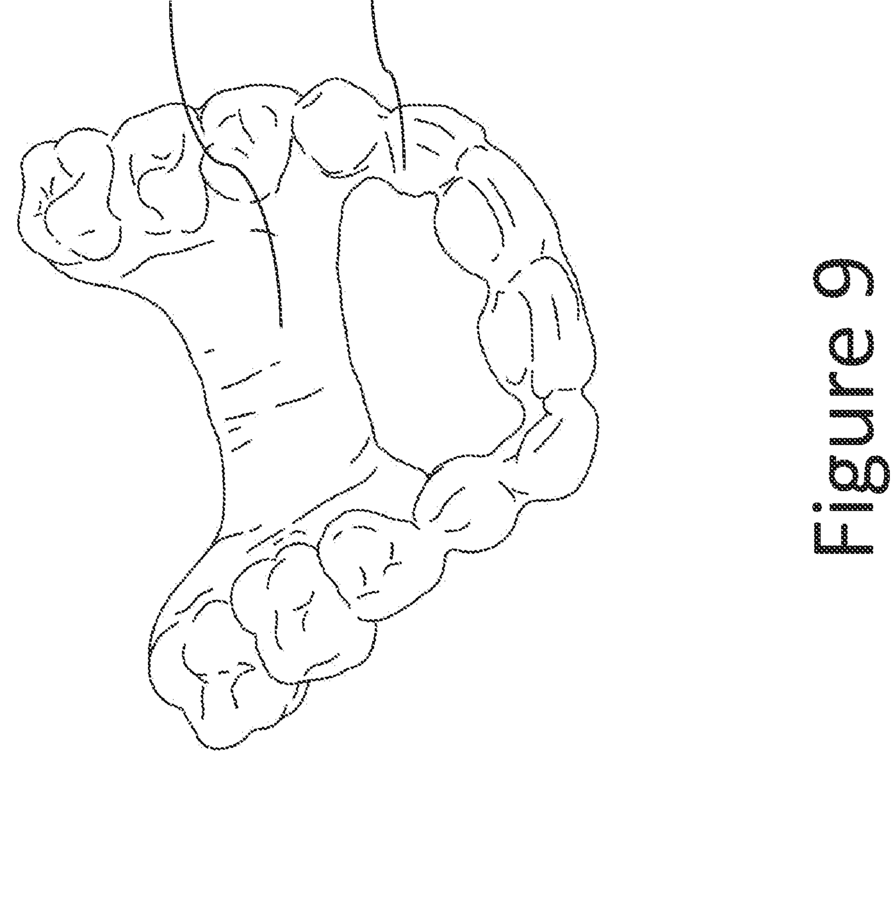
FIG. 9 illustrates an example of an appliance having an arch element connecting the posterior sides of the arch according to a number of embodiments of the present disclosure.
Figure 10:
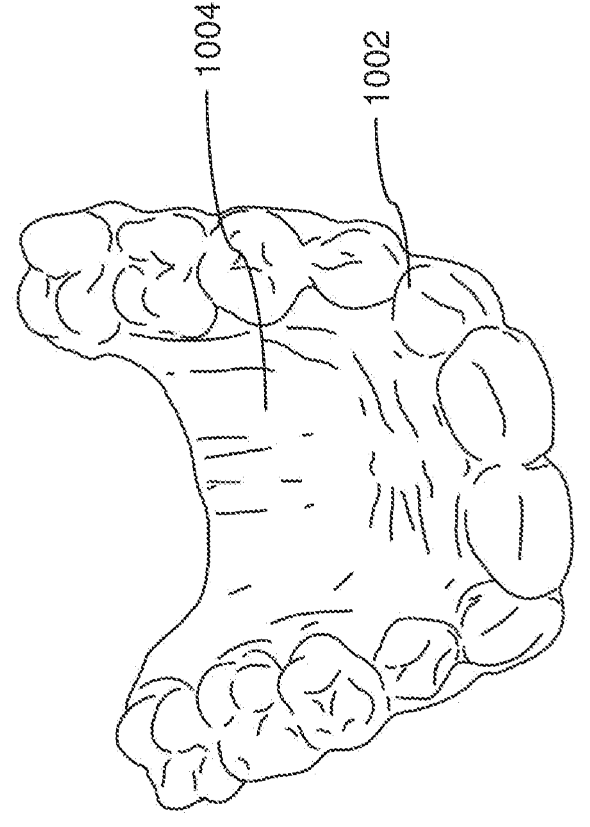
FIG. 10 illustrates an example of an appliance having a full palatal arch element according to a number of embodiments of the present disclosure.
Figure 10:
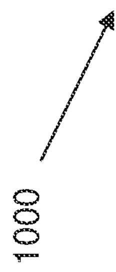
Figure 11:
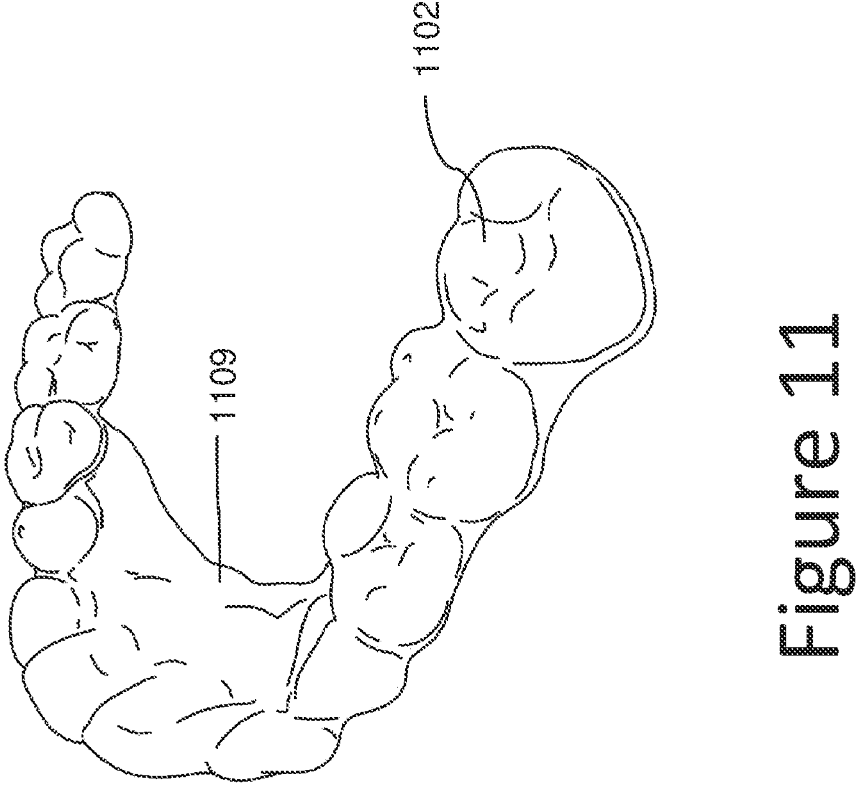
FIG. 11 illustrates an example of an appliance having an extended gingival feature thereon according to a number of embodiments of the present disclosure.
Figure 11:
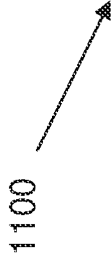

In various embodiments of the present disclosure, an arch element (e.g., a trans-palatal arch element as illustrated in the embodiments of FIGS. 9 and 10 or a mandibular arch element as illustrated in the embodiments of FIGS. 7 and 11) can extend from the removable shell and across at least a portion of the arch width of the removable shell. The arch width can be from molar to molar, from premolar to premolar, from canine to canine, or from any tooth on the left side to any tooth on the right side.

In mandibular arch elements, the arch can extend along the inside of the teeth in the anterior area of the patient's mouth, as shown in FIGS. 7 and 11. In palatal arch elements, the arch element can extend across the palate (trans-palatal) and can extend across at the posterior, anterior, in parts of one or the other, or in both areas of the patient's mouth.

In some embodiments, the arch element can be formed of a first material and from a second material that is a different than the first material in at least one physical property. For example, the first material may be a polyurethane material and the second material also be a polyurethane material with the same chemical formula, but of different hardness or rigidity due to greater crosslinking. Or, the first material can be of one chemical composition (e.g. polyurethane), and the second material of an entirely different chemical composition (e.g. polyvinyl chloride).

In some embodiments, the second material is more resilient than the first material. This can be beneficial in embodiments, for example, where there is an initial need for a more rigid arch element and then a more resilient arch element later in treatment, among other situations where such an embodiment may be utilized.

The arch element can have a width specific to a stage of a treatment plan and can be designed to expand an arch of the teeth of the patient to that specified width, which may be less than the full width in which that arch is to be expanded (i.e., the arch expansion can be incrementally accomplished by expanding the arch a little at a time over the use of several differently designed sequential dental appliances). Or the arch may be over-expanded to compensate for incomplete biological response to the desired outcome, where the actual width of the teeth is less than the width programmed or built into the stage(s) of the treatment plan which can provide a constant transverse expansion force to achieve slow palatal expansion.

For example, rather than providing a strong force, such as 10 to 50 N for a short period of a few days to a few weeks, embodiments of the present disclosure can provide a lesser force, such as 3 to 9 N, for a longer period, such as a month to six months. This force can be used, for example, to move palatal plates, move teeth outward, and/or maintain the teeth and/or jaw in a particular orientation while musculature and bone are adjusting to the orientation and to prevent movement of the teeth or jaw back toward their initial orientation.

In some embodiments, the second material can include, for instance, a more rigid material than the first material designed to provide greater resistance and/or force in a horizontal direction (i.e., transverse direction) against the posterior teeth (e.g., molars and bicuspids) of the arch of the patient. In various embodiments, this second material can be designed to impart force to the molars and/or other teeth on the jaw of the patient in order to either help preserve or change the transverse dimensions of the arch. Additionally, in some embodiments, with the use of appliances on the upper and lower jaws, the force can be imparted to parts of the opposing jaw (e.g., teeth, jaw bone, etc.).

The expansion of an arch of teeth in the patient can be used to treat malocclusions such as crossbites, sagittal problems, crowding, and/or to help prevent or resolve impacted teeth, in various embodiments. The transverse support elements can be designed to not interfere with the shells of the dental appliance. In this manner, a dental appliance in accordance with embodiments of the present disclosure can be used to concurrently expand or constrict an arch of the patient while repositioning a number of teeth of the patient.

For example, in some embodiments, the shell of the dental appliance can be used to provide force on one or more teeth to change their location or orientation. Embodiments of the present disclosure can be utilized to treat Class I, Class II, and Class II malocclusions.

For instance, with Class I malocclusions, teeth of the patient are inserted into cavities in the shell and the shell applies force to one or more teeth to change their location or orientations. With Class II (overbite or overjet) and Class III (underbite) malocclusions, the appliance can include other features, such as cut outs (areas cut out of the appliance shell material to allow access to the tooth surface through the appliance or to form, for example, a hook to attach a resilient member (e.g., an elastic band material) between the upper and lower jaw, to for instance treat a overbite or overjet.

As discussed above, in some embodiments, a plurality of appliances can be worn by a patient successively to achieve gradual expansion (or constriction) of the arch of teeth in the patient. For instance, each of a plurality of dental appliances can include an incrementally wider width to expand the arch of the patient in incremental distances. In some such embodiments, since this arch expansion technique can be accomplished concurrently with other orthodontic treatments, the arch expansion can be accomplished over a series of appliances that will be utilized, for example, over a period of less than six months, thereby making any pain and/or discomfort of the patient more consistent and less arbitrary without prolonging the overall time for orthodontic treatment.

In some embodiments, an appliance can be formed using a thermoforming process. For instance, a first portion of an arch element can be formed of a material using a virtual model of the palate of the patient and a virtual model of a number of teeth of the patient.

The first portion of the arch element can be wider than the arch width of the number of teeth of the first jaw of the patient and can be shaped to substantially follow contours of the palate of the patient. For expansion, this difference in the width will facilitate the movement of the arch outward toward the wider position of the arch element generating a transverse expansion force.

A removable shell can be formed over a set of molded teeth. The removable shell can include a number of cavities formed therein and shaped to receive the number of teeth of patient and a second portion of the arch element. The second portion of the arch element can be formed of the same material as the removable shell and can include the same width as the first portion of the arch element.

The first portion of the arch element and the second portion of the arch element can, for example, be connected to form the dental appliance. The first portion and second portion can be connected, in accordance with various embodiments of the present disclosure, for example, by thermoforming the removable shell over the set of molded teeth with the first portion of the arch element placed within the set of molded teeth (e.g., encapsulated), or via direct fabrication of the arch elements from a virtual model, then by fusing the two materials together (e.g., ultrasonic welding), by adhering the first portion and the second portion using an agent subsequent to forming the first portion and the removable shell, and/or by adding a number of features to the first portion of the arch element (e.g., as discussed further herein).

In this manner, a dental appliance can be formed that has two distinct material properties, but is unitary in nature (e.g., forms a single body that can be used by the patient even though it is formed of two materials). Such embodiments, are discussed with regard to the embodiments illustrated in the figures and discussed below.

In the detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, "a number of" a particular thing can refer to one or more of such things (e.g., a number of teeth can refer to one or more teeth).

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1A, and a similar element may be referenced as 304 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1A illustrates an example of an appliance according to a number of embodiments of the present disclosure. The appliance 100, illustrated in the embodiment of FIG. 1A, can include an upper dentition appliance (e.g., an appliance placed on the upper jaw of the patient). An upper jaw can include a maxilla and can include a number of teeth of a patient's upper dentition. The lower jaw can include a mandible and can include a number of teeth of the patent's lower dentition.

Appliances can include any positioners, retainers, and/or other removable dental appliances for finishing and maintaining teeth positioning in connection with a dental treatment. These appliances may be utilized by the treatment professional in performing a treatment plan. For example, a treatment plan can include the use of a set of appliances, created according to models described herein. Appliances, in some embodiments, can include flexible dental appliances which serve, in part, as a prosthesis for esthetics and/or dental function.

An appliance can, for example, be fabricated from a polymeric shell, and/or formed from other material, having a cavity shaped to receive and apply force to reposition one or more teeth from one teeth arrangement to a successive teeth arrangement. The shell may be designed to fit over a number of, or in many instances all, teeth present in the upper and/or lower jaw. The shell can include an interior surface (e.g., adjacent to a surface of the teeth place therein) and an exterior surface. The interior surface is configured to receive and a apply forces to the teeth therein to reposition a number of teeth of the patient, for example.

In accordance with some embodiments of the present disclosure, the appliance 100 can include a removable shell 102 formed of a first material having a number of cavities formed therein. As discussed above, the number of cavities can be shaped to receive teeth of the patient.

The appliance 100 can include an arch element 104 extending from the removable shell 102 in a lingual direction and across an arch width of the removable shell 102. The arch width of the removable shell 102, as used herein, is a space between the cavities of the removable shell 102. For instance, the arch element 104 can expand across a surface of the mouth of the patient when the dental appliance 100 is placed over the teeth of the patient. The surface of the mouth can include, for instance, a palate and/or floor of the mouth.

The arch element, as illustrated by FIG. 1A, can be formed of the first material and a structural reinforcement feature thereon. As defined herein, a structural reinforcement feature can be any structure that increases the rigidity of a portion of the appliance or increases one or more force vectors (force provided in X, Y, and/or Z axial directions). In one example, with respect to the embodiment of FIG. 1A, the arch element 104 includes areas that are corrugated 106.

As discussed above, the arch element can be designed to expand an arch of teeth of the patient. For instance, the width of the arch element can be wider than the actual arch width of the teeth of the patient in order to define the desired arch width incremental target for the teeth. An arch width of the teeth of the patient can include a distance between teeth of the left posterior side of the patient's dentition and teeth of the right posterior side of the patient's dentition. As an example, the arch element can be 0.25 millimeters wider than the arch width of the teeth of the patient.

The element 104 as shown is designed to provide structural reinforcement to the posterior section but also allows flexibility in the anterior section, for example, if anterior transverse force is not desired. An advantage of this flexibility would be to ease the insertion force.

In some embodiments, the arch element, or a portion thereof, can be made from a second material that can be different in at least one material property (e.g., chemical property of a material, weight of material used, mixture of chemicals used, etc.) than the first material. For instance, the rigidity of the second material can apply a force to at least a portion of the number of teeth in a transverse direction (e.g., horizontal direction) to expand the arch of teeth of the patient.

Figure 5:
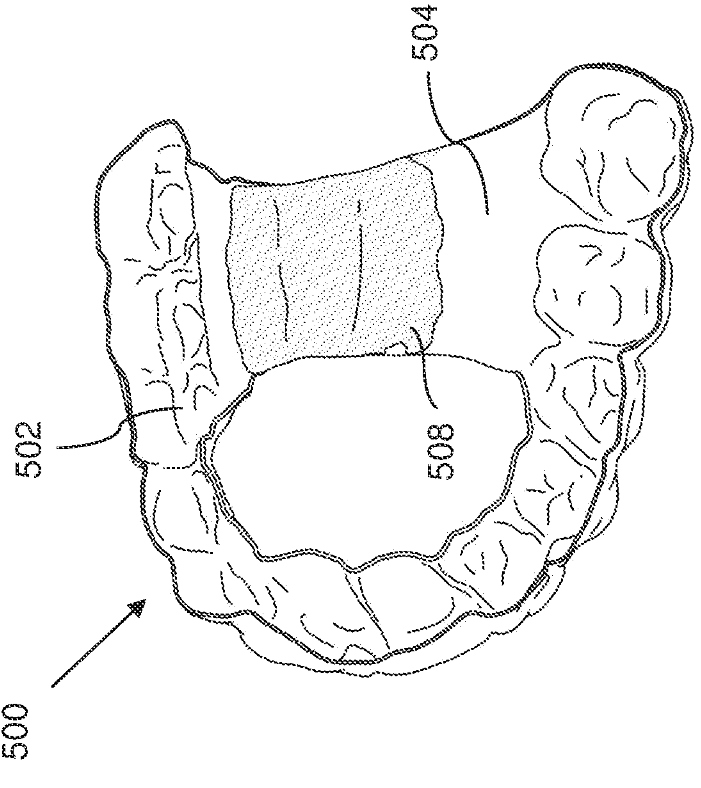
FIG. 5 illustrates an example of an appliance having a structural reinforcement material according to one or more embodiments of the present disclosure.
Figure 5:
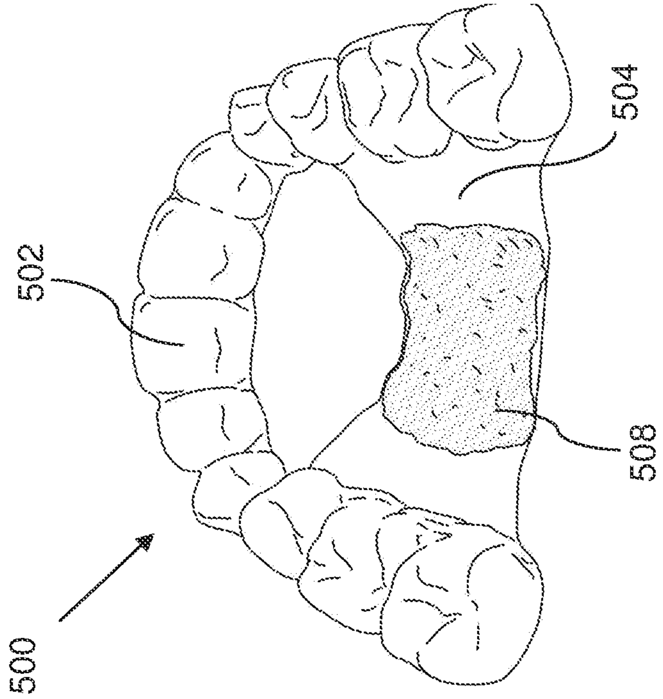

In some embodiments, the first material of the arch element can form a first layer and the second material of the arch element can form a second layer (e.g., as illustrated in the embodiment of FIG. 5). The first layer of the first material can be formed integrally with and of a same material as the removable shell 102, for instance. The second layer of the second material can be formed in a separate process and attached to the first layer of the first material, for example (e.g., as discussed further herein).

In some embodiments, the arch element can follow contours of a surface of the mouth of the patient when the appliance 100 is placed over the teeth of the patient. For example, the arch element can be shaped to substantially follow the contours of the palate of the patient. This can be accomplished, for example, by taking a mold or scan of the surface of the palate of the patient and then forming the surface of arch element to substantially match the mold/scan surface (i.e., the surface may not be identical, as the arch element may be designed to be wider as discussed above and therefore is not an identical copy of the mold/scan surface, and therefore may substantially match, but not be identical).

The contours of the palate in the appliance may be interpolated in anticipation of a stretching of the tissues during the expansion, in order to better accommodate the seating of the appliance in the patient's mouth. In other words, the shape of the appliance is designed to include an expected stretching of the patient's palatal or lower lingual tissues during dental expansion, and not just a movement of the teeth.

In some embodiments, one side of the arch element 104, can be adjacent to and/or in contact with a tongue of the patient. The other side of the arch element can, for example, be adjacent to and/or in contact with a surface of the patient's mouth (e.g., the palate and/or floor of the patient's mouth). Further, as discussed herein, in some embodiments, using the patient's mouth mold and/or scan data, the trans-palatal arch may be designed to contact the palate (e.g., if more support is desired) or it may be designed not to have contact (e.g., for patient comfort).

The appliance 100 can be used for repositioning the number of teeth of the patient concurrently with expansion of the arch of teeth of the patient utilizing the arch element. The expansion of the arch of teeth can include movement of posterior teeth (e.g., molars) and/or other teeth of the arch of the patient in a transverse direction and/or stretching of the maxillary suture of the patient (e.g., separates the maxillary halves in the region of the suture), along with a stretching of the surrounding soft tissues (e.g., the palatal gingiva) during the expansion.

The simultaneous treatment of misalignment of a patient's dental arch (e.g., insufficient dental arch width) in conjunction with teeth alignment issues (e.g., rotation, tipping, etc.) can, for example, potentially eliminate a second phase of a two phase treatment protocol, make the second phase less complex or a little more comfortable for the patient, shorten treatment times when compared to current linear two-phase treatment protocols that first treat the misalignment of a patient's dental arch followed by treatment of misalignment of the patient's teeth. That is, the arch element can, in accordance with a number of embodiments, avoid and/or not interfere with engagement of the removable shell 102 with the teeth therein and thereby allow for correction of various tooth misalignment issues during the arch expansion process so that both arch expansion and alignment correction occurs in tandem rather than as separate phases.

Although the present embodiment of FIG. 1A illustrates an appliance for an upper dentition of a patient, embodiments are not so limited. Appliances, in accordance with some embodiments, can include an appliance for a lower dentition of a patient and/or an appliance for an upper dentition and a lower dentition.

In some such embodiments, the arch element extending from a surface of an appliance for a lower dentition can substantially follow the contours of a portion of the floor of the patient's mouth. While the lower arch (i.e., mandible) does not contain a suture that can be split as the upper arch does, the same principles of appliance design described herein may be applied even in the lower in order impart greater transverse stability and/or force through the lower arch appliance to more effectively deliver transverse forces to the lower dentition for dental expansion purposes.

In some such embodiments, since a generally horizontal span across the bottom of the patient's mouth may not be suitable for positioning of an arch element (e.g., because the tongue is in the way), an appliance of the present disclosure may include reinforced portions of the dental appliance that impart forces to help dentally expand the lower arch of the patient. For example, a portion of the arch element may be positioned in front of the tongue of the patient or in close proximity to the tongue in order to impart a horizontal force and the shell may be designed to transfer or redirect the resulting anterior force generated by the tongue towards the back portion of the jaw of the patient (e.g., closer to the molars).

In some embodiments, a first appliance can be placed over the upper dentition and a second appliance can be placed over the lower dentition of the patient. The first appliance and the second appliance can each have an arch element.

The arch element of the first appliance and the arch element of the second appliance can expand the dental arch of the upper dentition and the dental arch of the lower dentition, respectively, to the same degree. Or in the case of Class II or Class III correction where a disproportionate amount of expansion/constriction is needed, the amounts can be coordinated so that the expansion targeted is suitable for the desired amount of anterior-posterior bite change.

In some embodiments of the present disclosure, the appliance 100 can be a portion of a treatment plan. For instance, the treatment plan can include a series of appliances designed to incrementally implement a treatment plan. Each of the series of appliances can be a stage of the incremental treatment plan, for instance. The series can be used for treating misalignment of teeth of a patient and/or misalignment of one or more arches of teeth of the patient. In some such embodiments, one arch can be expanded while the other arch is not expanded or both arches can be expanded simultaneously. Or one arch can be expanded while the other one is constricted.

For instance, a first appliance, of a series of appliances designed to incrementally implement a treatment plan can comprise a first shell formed of a first material having a plurality of cavities therein designed to receive teeth of a first jaw. The first appliance can include a first arch element formed of a first layer of the first material and a second layer of the second material different than the first material.

The first arch element can extend from the first shell across an arch width of the first shell. For instance, the first arch element can have a first width specific to a first stage of the treatment plan and/or can be designed to expand an arch of the teeth of the patient.

A second appliance, of the series of appliances, can comprise a second shell having a plurality of cavities therein designed to receive teeth of the first jaw. The second appliance can include a second arch element. For example, the second arch element can have a second width specific to a second stage of the treatment plan.

The second width can be wider than the first width. For instance, the second width can include an incremental increase in width as compared to the first width. The successive incremental increase in the arch width of the appliances corresponds to the desired gradual increase in the actual physical arch of the patient.

In accordance with some embodiments of the present disclosure, the series of appliances can include a third appliance. The third appliance can include a third shell having a plurality of cavities therein designed to receive teeth of the second jaw (e.g., the lower jaw). For instance, the third appliance can include a third arch element designed to expand the arch of teeth of the patient. The third arch element can have a third width specific to the first stage of the treatment plan.

In such an embodiment, the first appliance and third appliance can be for a first stage of the treatment plan. For instance, a patient can place the first appliance over the teeth of the first jaw (e.g., upper jaw) and can place the third appliance over the teeth of the second jaw (e.g., lower jaw). The first arch element of the first appliance and the third arch element of the third appliance can be designed to expand the arch of teeth of the first jaw and the arch of teeth of the second jaw to a same degree (e.g., equal distance) based on the first width and the second width. Equal distance in expansion amount is desirable if the upper and lower arches are already in good coordination and no front-to-back change in the bite is desired or planned.

In various embodiments, the series of appliances can include a fourth appliance. The fourth appliance can include a fourth shell having a plurality of cavities therein designed to receive teeth of the first jaw. The fourth appliance may not include an arch element and/or can include a fourth arch element, for example.

Although the present embodiments illustrate two stages of a treatment plan, embodiments in accordance with the present disclosure are not so limited. Treatment plans can include a variety of number of stages, including more or less than two treatment stages. At least a portion of the stages can include treatment for gradual expansion of an arch of teeth of a patient. Alternatively and/or in addition, one or more of the stages may not include arch elements, in various embodiments.

In an example embodiment, a system can include: a first appliance, of a series of appliances designed to incrementally implement a treatment plan, having an arch element shaped to span at least a portion of the surface of a patient's palate, wherein the arch element is designed to expand an arch of the teeth of the patient, wherein the arch element has a width specific to a first stage of the treatment plan and one or more tooth engagement structures and wherein each structure contacts at least one of a surface of a tooth or a surface of the patient's gingiva and imparts a force thereto. A second appliance, of the series of appliances, can include: a second arch element shaped to span at least a portion of the surface of a patient's palate, wherein the second arch element is designed to expand the arch of the teeth of the patient, wherein the arch element has a width specific to a second stage of the treatment plan and one or more tooth engagement structures and wherein each structure contacts at least one of a surface of a tooth or a surface of the patient's gingiva and imparts a force thereto.

Figure 1B:
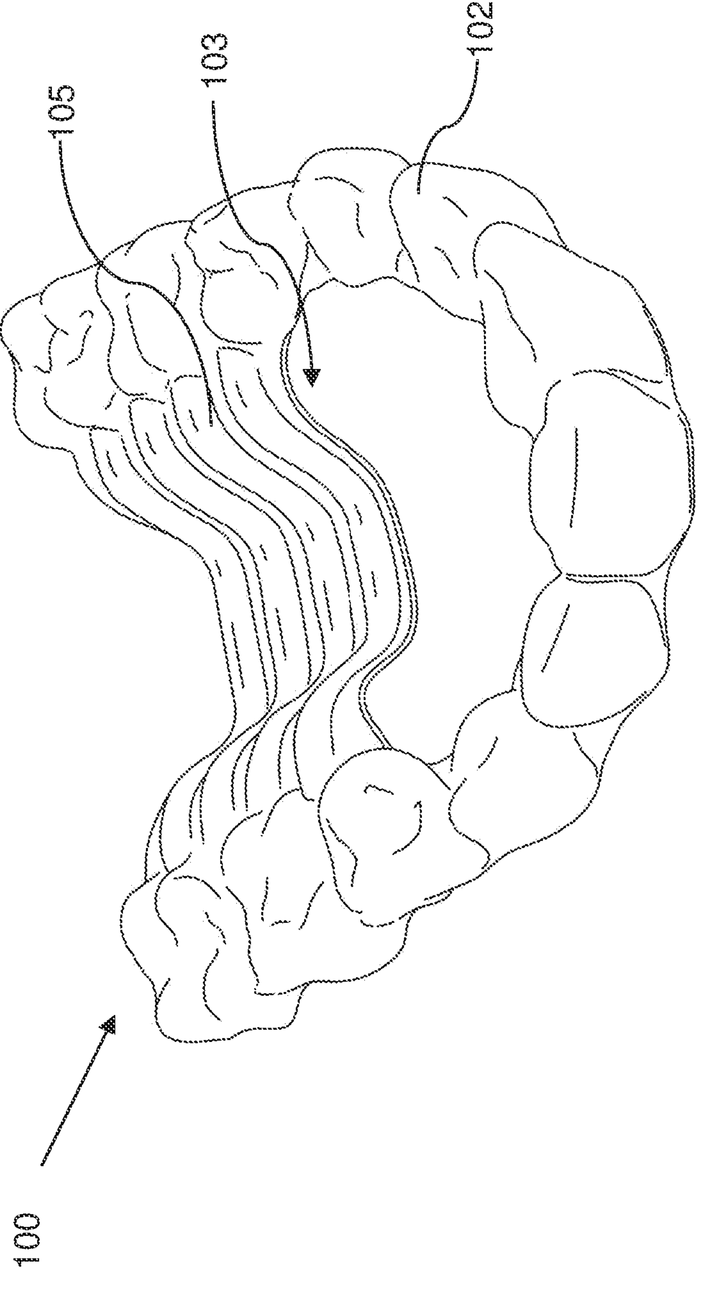
FIG. 1B illustrates another example of an appliance having a structural reinforcement feature provided thereon according to a number of embodiments of the present disclosure.

FIG. 1B illustrates an example of an appliance according to a number of embodiments of the present disclosure. Similar to the embodiment illustrated in FIG. 1A, the appliance 100, illustrated in the embodiment of FIG. 1B, can be utilized as an upper dentition appliance (e.g., an appliance placed on the upper jaw of the patient).

In accordance with some embodiments of the present disclosure, the appliance 100 can include a removable shell 102 formed of a first material having a number of cavities formed therein. As discussed above, the number of cavities can be shaped to receive teeth of the patient.

The appliance 100 can include an arch element 103 extending from the removable shell 102 in a lingual direction and across at least a portion of the arch width of the removable shell 102. The arch width of the removable shell 102, as used herein, is a space between the cavities of the removable shell 102.

For instance, the arch element 103 can span across a surface of the mouth of the patient when the dental appliance 100 is placed over the teeth of the patient. The surface of the mouth can include, for instance, a palate and/or floor of the mouth. In such an embodiment, the arch element is designed to expand an arch of the teeth of the patient, wherein the arch element has a width specific to a stage of a treatment plan. Accordingly, in some embodiments, the width of the arch element is wider than an arch width of the teeth of the patient.

The arch element, as illustrated by FIG. 1B, can be fabricated having a structural reinforcement feature thereon. In the example of FIG. 1B, a number of ridges and valleys 105 are formed on the arch element 103.

The ridge and valley structure 105 can be used to provide additional rigidity to the arch element which can allow more force to be provided. In this manner, the dental appliance can be utilized to perform more applications, such as to move palatal plates, move teeth outward, and/or maintain the teeth and/or jaw in a particular orientation while musculature and bone are adjusting to the orientation and to prevent movement of the teeth or jaw back toward their initial orientation.

Although two examples of structural reinforcement features are illustrated in FIGS. 1A and 1B, any suitable structural reinforcement feature can be utilized that will increase the rigidity of the arch element.

Figure 2:
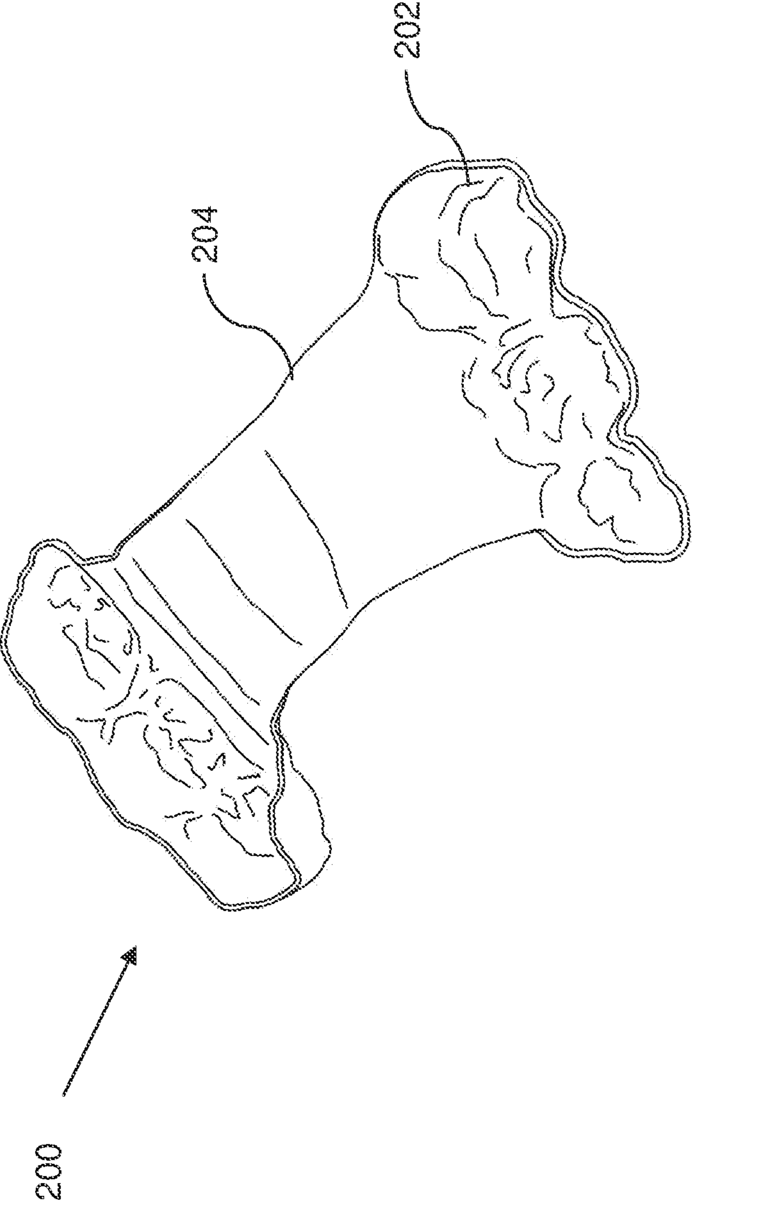
FIG. 2 illustrates an example of an appliance embodiment according to the present disclosure.

FIG. 2 illustrates an example of an appliance embodiment according to the present disclosure. In the embodiment of FIG. 2, the shell 202 of the appliance 200 has cavities to accept less than all of the teeth of the patient's jaw. For instance, in FIG. 2, the appliance has cavities for the molars of the patient. This can be beneficial as it will only apply for to those teeth, thereby focusing the forces imparted by the appliance to those teeth that are in need of adjustment at this stage in the patient's treatment. In the embodiment of FIG. 2, the appliance has an arch element 204 with a smooth surface. Embodiments of the present disclosure can be created in a variety of ways.

For example, in some embodiments, an arch element can be formed of a material using a virtual model of a palate of a patient and a virtual model of a number of teeth of the patient. The arch element can be wider than an arch width of the number of teeth of the first jaw of the patient, specific to a stage of a treatment plan, and can be shaped to substantially follow contours of the palate of the patient (that may also include modeling of anticipated changes to the palatal contours due to tissue stretching), for instance.

The palatal contours in the model can also be specifically raised in a vertical direction so that any appliance which is formed over the model is slightly raised in comparison to the actual contours of the palate. In other words, a slight gap between the actual palate and the palatal coverage portion of the appliance can be designed to be present. This gap allows the transverse benefits of the appliance design to be in effect while not necessarily requiring an exact fit of the appliance to the contours of the tissue.

A slight offset in the vertical dimension can minimize any disruption in speech, swallowing, or feel due to changes in tongue position that may result in the alteration. More importantly, intentionally raising the vertical dimension of only the palatal tissue regions has the benefit of not needing perfect modeling of any non-linear stretching that might take place in the tissue. This can greatly reduce the risk of uncomfortable pressure spots and sores caused by the appliance. Having to relieve pressure spots in the appliance can be very time consuming for the doctor, and if the appliance is thin to begin with, such adjustments can lead to weakened areas in the appliance.

A virtual model of a number of teeth of the patient can, for example, include an initial virtual dental model and/or an intermediate virtual dental model. A virtual model of the palate (and/or other tissue surfaces of the patient's mouth) can include the contours of the palate. In some embodiments, the virtual model of the palate and the virtual model of the number of teeth can include a single virtual model and/or two separate virtual models.

The arch element can be formed by a rapid prototyping process, such as, for example, by a Computer-aided manufacturing (CAM) milling, stereolithography, 3D printing, fused deposition modeling (FDM), selective laser sintering (SLS), and/or photolithography. Advantages of such techniques can include, for example, that multiple materials can be used in a single build, various cross sectional thickness's can be designed and built for rigidity, and easy fabrication of a complex organic geometry.

The arch element can be shaped to fit between the arch of the first jaw of the patient while being sized to be wider than the arch width of the number of teeth of the first jaw of the patient.

In some embodiments, the flexibility of the appliance is such that it can be compressed in the transverse direction during seating in order to activate the expansion force. This force then gets released and directed towards the teeth, soft tissues, and/or jaw bone when then the appliance is seated in the mouth.

As discussed above, in some embodiments, the arch element can be shaped to substantially follow contours of the palate of the patient using the virtual model of the palate. Alternatively and/or in addition, the arch element can be shaped to substantially follow contours of the floor of the mouth of the patient using a virtual model of the floor of the mouth.

To form an appliance, a removable shell can, for example, be formed over a set of molded teeth. The removable shell can include a number of cavities formed therein, wherein the number of cavities are shaped to receive the number of teeth of the patient. In various embodiments, the removable shell can include a second portion of the arch element formed of the same material as the number of cavities. The second portion of the arch element can be formed integrally with and/or during a same process as the number of cavities, for instance.

The material forming the first portion of the arch element can be more rigid than the material forming the second portion of the arch element, for instance. In some embodiments, the second portion of the arch element can include the same width as the first portion of the arch element.

Alternatively and/or in addition, the first portion of the arch element can be designed to be adjacent to and/or in contact with a surface of the patient's mouth (e.g., the palate and/or floor of the patient's mouth) when the dental appliance is placed over the teeth of the patient. The second portion of the arch element can be designed to be adjacent to and/or in contact with a tongue of the patient when the dental appliance is placed over the teeth of the patient.

The dental appliance can be made, for example, by thermoforming a piece of plastic over a physical dental model. The physical dental model, for instance, can represent an incremental position to which a patient's teeth are to be moved. This desired position of the patient's teeth includes any underlying desired changes to the skeletal structure which holds the teeth in place.

The physical dental models can be manufactured by downloading a Computer-aided Design (CAD) virtual dental model file into a rapid prototyping process, such as, for example, a Computer-aided manufacturing (CAM) milling, stereolithography, 3D printing, fused deposition modeling (FDM), selective laser sintering (SLS), and/or photolithography. Advantages of such techniques can include, for example, that multiple materials can be used in a single build, various cross sectional thickness's can be designed and built for rigidity, and easy fabrication of a complex organic geometry. The virtual dental model can be hollowed out or "shelled" before it is sent for manufacturing to save on material cost if printed, for example.

The dental model (e.g., set of molded teeth) can be created from a virtual model of a number of teeth of a patient. A dental model can be formed in accordance with a unique treatment file that identifies a patient, a stage of a treatment plan, the virtual model of the number of teeth, and/or whether the dental model is of the upper and/or lower dental arch.

In some embodiments, a treatment file can be accessed by a rapid prototyping apparatus machine, such as a SLA or printing, to form and/or create the dental model. The result of the dental model can include a set of molded teeth (e.g., a physical set of molded teeth). The set of molded teeth can include at least a replica of a number of teeth of the patient. The dental model can be used to make a dental appliance, for example, by creating a negative impression of the dental model using polymeric sheets of material and vacuum forming heated sheets of the polymer over the dental model, as discussed above.

For instance, a dental appliance can be created by layering a thermoformable sheet of material and/or multiple sheets of one or more materials over the dental model. The materials can include at least one polymeric material, for instance.

Generally, the dental appliance can be produced and/or formed, for example, by heating the polymeric thermoformable sheet and vacuum or pressure forming the sheet over the dental model (i.e., over a number of the teeth in the mold). The shape of the sheet of material can be designed to intentionally vary in thickness in some portions of the sheet (beyond natural variations in thickness during the shaping process) as it conforms to the mold shape. A dental appliance can, for example, include a negative impression of the dental model. The appliance and/or parts thereof may be transparent, semi-transparent, or opaque in such a way as to emulate a natural tooth shade.

Figure 3:
FIG. 3 illustrates virtual model of an appliance according to a number of embodiments of the present disclosure.
Figure 3:
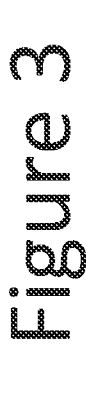

FIG. 3 illustrates virtual model of an appliance according to a number of embodiments of the present disclosure. As illustrated by the embodiment of FIG. 3, the virtual dental appliance 300 can include a removable shell 302, an arch element 304.

The removable shell 302 can include a number of cavities formed therein, wherein the number of cavities are shaped to receive the number of teeth of the patient. The removable shell 302, as illustrated in FIG. 3, can include a virtual removable shell, a physical removable shell, and/or material to be thermoformed over a dental model (e.g., as discussed further herein).

The model of the lower jaw, can include a virtual model of a surface of the mouth of the patient including a virtual model of the number of teeth of patient. The virtual model (e.g., the model of the lower jaw) can be used to print and/or mill the arch element.

Alternatively and/or in addition, the model of the lower jaw can include a physical set of molded teeth. A physical set of molded teeth can be created, for instance, utilizing a virtual model of the surface of the mouth and/or the teeth of the patient. The removable shell 302 can be formed over a physical set of molded teeth, in various embodiments.

Figure 4:
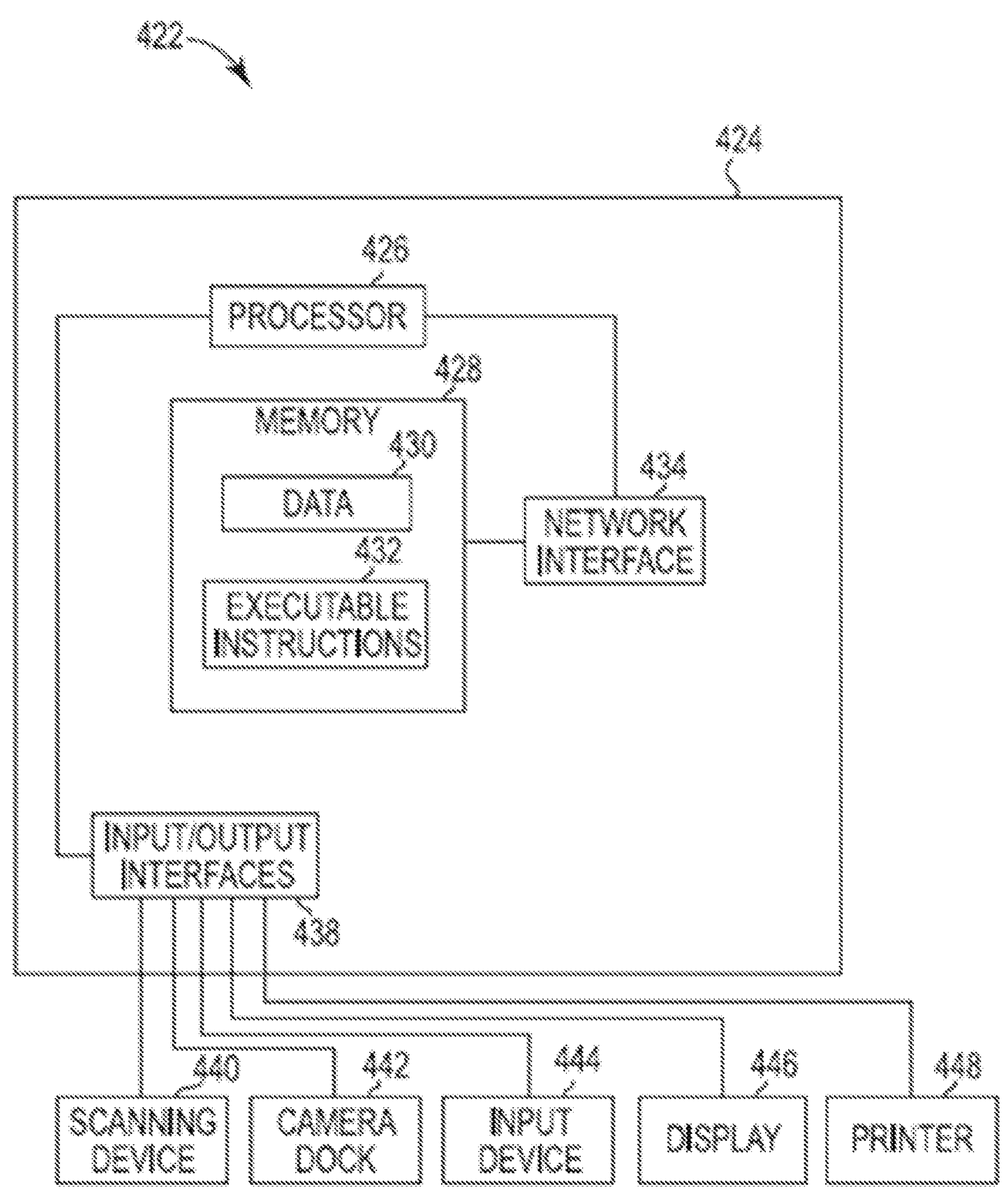
FIG. 4 illustrates an example computing device readable medium having executable instructions that can be executed by a processor to perform a method according to one or more embodiments of the present disclosure.

FIG. 4 illustrates an example computing device readable medium having executable instructions that can be executed by a processor to perform a method according to one or more embodiments of the present disclosure. For instance, a computing device 424 can have a number of components coupled thereto. The computing device 424 can include a processor 426 and a memory 428. The memory 428 can have various types of information including data 430 and executable instructions 432, as discussed herein.

The processor 426 can execute instructions 432 that are stored on an internal or external non-transitory computer device readable medium (CRM). A non-transitory CRM, as used herein, can include volatile and/or non-volatile memory. Volatile memory can include memory that depends upon power to store information, such as various types of dynamic random access memory (DRAM), among others. Non-volatile memory can include memory that does not depend upon power to store information.

Memory 428 and/or the processor 426 may be located on the computing device 424 or off the computing device 424, in some embodiments. As such, as illustrated in the embodiment of FIG. 4, the computing device 424 can include a network interface 434. Such an interface 434 can allow for processing on another networked computing device, can be used to obtain information about the patient, and/or can be used to obtain data and/or executable instructions for use with various embodiments provided herein.

As illustrated in the embodiment of FIG. 4, the computing device 424 can include one or more input and/or output interfaces 438. Such interfaces 438 can be used to connect the computing device 424 with one or more input and/or output devices 440, 442, 444, 446, 448.

For example, in the embodiment illustrated in FIG. 4, the input and/or output devices can include a scanning device 440, a camera dock 442, an input device 444 (e.g., a mouse, a keyboard, etc.), a display device 446 (e.g., a monitor), a printer 448, and/or one or more other input devices. The input/output interfaces 438 can receive executable instructions and/or data, storable in the data storage device (e.g., memory), representing a virtual dental model of a patient's dentition.

In some embodiments, the scanning device 440 can be configured to scan one or more physical dental models of a patient's dentition. In one or more embodiments, the scanning device 440 can be configured to scan the patient's dentition and/or dental appliance directly. The scanning device 440 can be configured to input data into the computing device 424.

In some embodiments, the camera dock 442 can receive an input from an imaging device (e.g., a 2D or 3D imaging device) such as a virtual camera, a printed photograph scanner, and/or other suitable imaging device. The input from the imaging device can, for example, be stored in memory 428.

The processor 426 can execute instructions to provide a visual indication of a treatment plan, a dental appliance, and/or a portion of an arch element on the display 446. The computing device 424 can be configured to allow a treatment professional or other user to input treatment goals. Input received can be sent to the processor 426 as data 430 and/or can be stored in memory 428.

Such connectivity can allow for the input and/or output of data and/or instructions among other types of information. Some embodiments may be distributed among various computing devices within one or more networks, and such systems as illustrated in FIG. 4 can be beneficial in allowing for the capture, calculation, and/or analysis of information discussed herein.

The processor 426, in association with the data storage device (e.g., memory 428), can be associated with the data 430. The processor 426, in association with the memory 428, can store and/or utilize data 430 and/or execute instructions 432 for designing a virtual appliance for a specific stage of a treatment plan and/or a series of virtual appliances for a treatment plan. Such data can include the virtual dental model and/or virtual model of a surface of a patient's mouth (e.g., palate and/or floor of the mouth).

The processor 426 coupled to the memory 428 can cause the computing device 424 to perform a method including, for example, providing a virtual model of a dental appliance having a shell configured to reposition a number of teeth of a patient. The virtual model of the dental appliance can include a second portion of an arch element. In various embodiments of the present disclosure, the processor 426 coupled to the memory 428 can cause the computing device 424 to perform the method including providing a virtual model of a first portion of an arch element (e.g., as illustrated in FIG. 3).

The virtual model of the dental appliance can, in some embodiments, be used to create a physical dental appliance. For example, dental appliance structural data can be stored in memory and used by an appliance manufacturing device to fabricate an appliance based upon the dental structural data. For instance, the memory can contain executable instructions to operate a thermoforming or direct fabrication device to form a dental appliance using those techniques.

As discussed above, in some embodiments, the arch element, or a portion thereof, can be made from a second material that can be more rigid than the first material. For instance, the rigidity of the second material can apply a force to at least a portion of the number of teeth in a transverse direction (e.g., horizontal direction) to expand the arch of teeth of the patient. In some embodiments, the rigidity of the second material can generate a necessary palatal expansion force to un-fuse the suture of the maxilla and/or move the portions of the maxilla with respect to each other, among other uses as discussed herein.

In some embodiments, the first material of the arch element can form a first layer and the second material of the arch element can form a second layer (e.g., as illustrated in the embodiment of FIG. 5). The first layer of the first material can be formed integrally with and of a same material as the removable shell 102, for instance.

The second layer of the second material can be fabricated in a separate process and attached to the first layer of the first material, for example (e.g., as discussed further herein). In some embodiments, the second layer may be the same thickness or a thicker layer of the material of the first layer. In such embodiments, these two layers can be referred to as a first portion and a second portion of the arch element.

The first portion and the second portion of the arch element can be wider than the arch width of the number of teeth of the first jaw of the patient. For instance, the arch element can be shaped to substantially follow contours of the palate of the patient and/or the floor of the mouth of the patient, in some embodiments. The palatal contour in the model can be raised in order to result in a uniform relief gap between the appliance and the actual contour of the palate. The physical first portion can be formed of a material that is more rigid than the material forming the second portion.

In some embodiments, in order to direct force from the arch element to other portions of the shell, a more rigid material may be applied between the arch element and other portions of the shell (e.g., a rigid material is applied over and/or under the shell material or encapsulated within layers of shell material). Additionally, the rigid material used to form the arch element and/or force directing portions can be reinforced by a reinforcement material (e.g., a metallic sheet or wire material provided to the second material).

In one example method embodiment, the method of forming a dental appliance, includes: forming a first virtual arch element using physical data of a palate and a number of teeth of a patient, wherein the arch element is wider than an arch width of the number of teeth of a first jaw of the patient, specific to a stage of a treatment plan and forming one or more virtual tooth engagement structures connected to the arch element and wherein each structure contacts a surface of a virtual tooth and imparts a virtual force thereto. Such embodiments can further include forming a second virtual arch element using physical data of a palate and a number of teeth of a patient, wherein the second arch element corresponds impart a force on one or more teeth according to a second stage of the treatment plan and replacing the first virtual arch element with the second virtual arch element.

The second virtual arch element can be formed, for example, by using physical data of a palate and a number of teeth of a patient, wherein the second arch element corresponds impart a force on one or more teeth according to a second stage of the treatment plan. Second one or more virtual tooth engagement structures connected to the second virtual arch element using physical data of a palate and a number of teeth of a patient can be formed, wherein the second one or more tooth engagement structures correspond to move one or more teeth according to a second stage of the treatment plan.

In some embodiments, prior to forming the second one or more virtual tooth engagement structures that correspond to move one or more teeth according to a second stage of the treatment plan, the location of the teeth is calculated based upon a movement of an arch of the patient accomplished by one or more estimated forces applied by the first arch element and first one or more virtual tooth engagement structures. This can be beneficial in better matching the virtual adjustment of the patient's mouth to what will actually occur in the patient's mouth, among other benefits.

In some embodiments, the method can further include defining a space between two virtual teeth or a virtual tooth and another feature of a patient's mouth based upon a calculated movement of an arch of the patient accomplished by one or more estimated forces applied by the first arch element and first one or more virtual tooth engagement structures and designing the second virtual tooth engagement structures to maintain the defined space. This can be beneficial wherein a space will be needed at a later time in treatment and/or as teeth are erupting, among other benefits.

As noted herein in some embodiments, the virtual appliance or data therefrom can be used to fabricate a physical appliance to be used in a patient's mouth. For example, in some embodiments, a method can further include forming a physical arch element based on the virtual arch element and one or more physical tooth engagement structures connected to the arch element and wherein each structure contacts a surface of a virtual tooth of a patient and imparts a virtual force thereto.

It should be noted that when first and second are used to describe items in this disclosure, it is only meant that one item comes before the next and does not indicate that the items be the first and second items in a series of multiple items. For example, a first item may be the third item in a series of items and the second item may be the sixth item in a series and the terms first and second are used to indicate that the first comes before the second in the series even though there may be more items in the series.

FIG. 5 illustrates an example of an appliance having a structural reinforcement material according to one or more embodiments of the present disclosure. In the embodiment of FIG. 5, the appliance 500 is shown at two different perspectives. The arch element 504 includes multiple materials (e.g., a first material layer which, in this case, is the same type of material as the shell 502, and a second material layer 508, which is a different material).

The first portion of the arch element can be connected to the second portion of the arch element to form the dental appliance. The arch element can, for example, be designed to provide a force to at least a portion of the number of teeth in a transverse direction to expand the arch of the teeth of the first jaw of the patient.

The first portion of the arch element and the second portion of the arch element can be connected in a variety of ways, in accordance with some embodiments of the present disclosure. For instance, the first portion of the arch element can be connected to the second portion of the arch element by thermoforming the removable shell over the set of molded teeth with the first portion of the arch element placed within the set of molded teeth (i.e., encapsulated by).

In some embodiments, an agent (e.g., a binding material) can be added to connect the first portion of the arch element to the second portion of the arch element created by thermoforming the removable shell. The first and second portions may also be secured to each other through ultrasonic welding or other techniques that allow adhesion without the need for an intermediary substrate such as a solvent or adhesive.

In accordance with some embodiments of the present disclosure, the first portion of the arch element can be connected to the second portion of the arch element by adhering the first portion and the second portion subsequent to forming the first portion of the arch element and the removable shell. In some embodiments, an agent can be utilized to cause the first portion of the arch element to adhere to the second portion of the arch element, however, in some embodiments, multiple materials used to form the first portion and second portion may be bonded without the use of an agent (e.g. ultrasonic welding, laser spot welding). The first portion can also be cured into place in direct contact with the dental model (e.g. a liquid resin such as polyacrylic painted onto the model and subsequently hardened through chemical or light cure) and then joined to the second material which is thermoformed over the first material to create an adherent bond between the two materials.

In various embodiments, the first portion can include a number of features (e.g., as discussed further herein). Connecting the first portion to the second portion of the arch element can include thermoforming the removable shell over the set of molded teeth with the first portion of the arch element placed within the set of molded teeth. The thermoformed material (i.e., the material the removable shell is formed of) can surround the number of features of the first portion of the arch element to connect the first portion to the second portion of the arch element.

The removable shell 502 can include the number of cavities and a second portion of the arch element 506. The second portion of the arch element 506 can be formed concurrently with and/or of the same material as the cavities, for instance, using the model of the lower jaw. The material forming the first portion of the arch element 504 can be more rigid than the material forming the second portion of the arch element 506.

The first portion of the arch element 504 can be connected to the second portion of the arch element 506 to form a dental appliance. For example, the first portion of the arch element 504 can be placed within the physical set of molded teeth (e.g., the model of the lower jaw). An agent can be added to the second portion of the arch element. The first portion of the arch element 504 and the second portion of the arch element 506 can be connected as the removable shell 502 is thermoformed over the set of molded teeth. That is, the first portion of the block element 504 can be encapsulated in the set of molded teeth and can be adhered to the second portion of the arch element 506 utilizing an agent.

Alternatively, the first portion of the arch element 504 can be connected to the second portion of the arch element 506 subsequent to forming the first portion of the arch element 504 and the removable shell 502. For instance, the removable shell 502 can be thermoformed over the physical set of molded teeth. Subsequently, the first portion of the arch element 504 can be adhered to the second portion of the arch element 506. The portions of the arch element 504, 506 can be adhered using an agent or through means not requiring an agent (such as ultrasonic welding), for instance.

Some embodiments of the present disclosure can be provided in multiple parts. This can be beneficial, for example, where the palate has been expanded, but the movement of teeth, by the cavities and other appliance structures is still ongoing. In such cases, an appliance such as that shown in FIG. 6A or 6B, may be suitable.

Figure 6A:
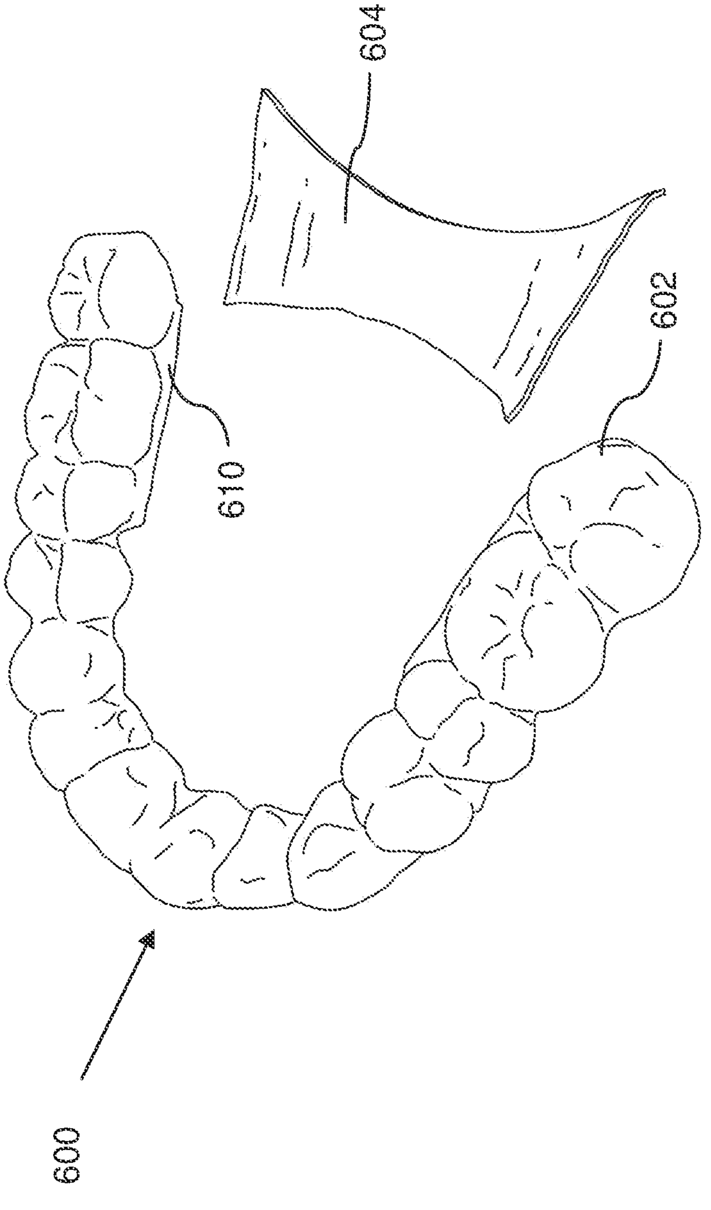
FIG. 6A illustrates an example of an appliance having a removable arch element according to a number of embodiments of the present disclosure.
Figure 6B:
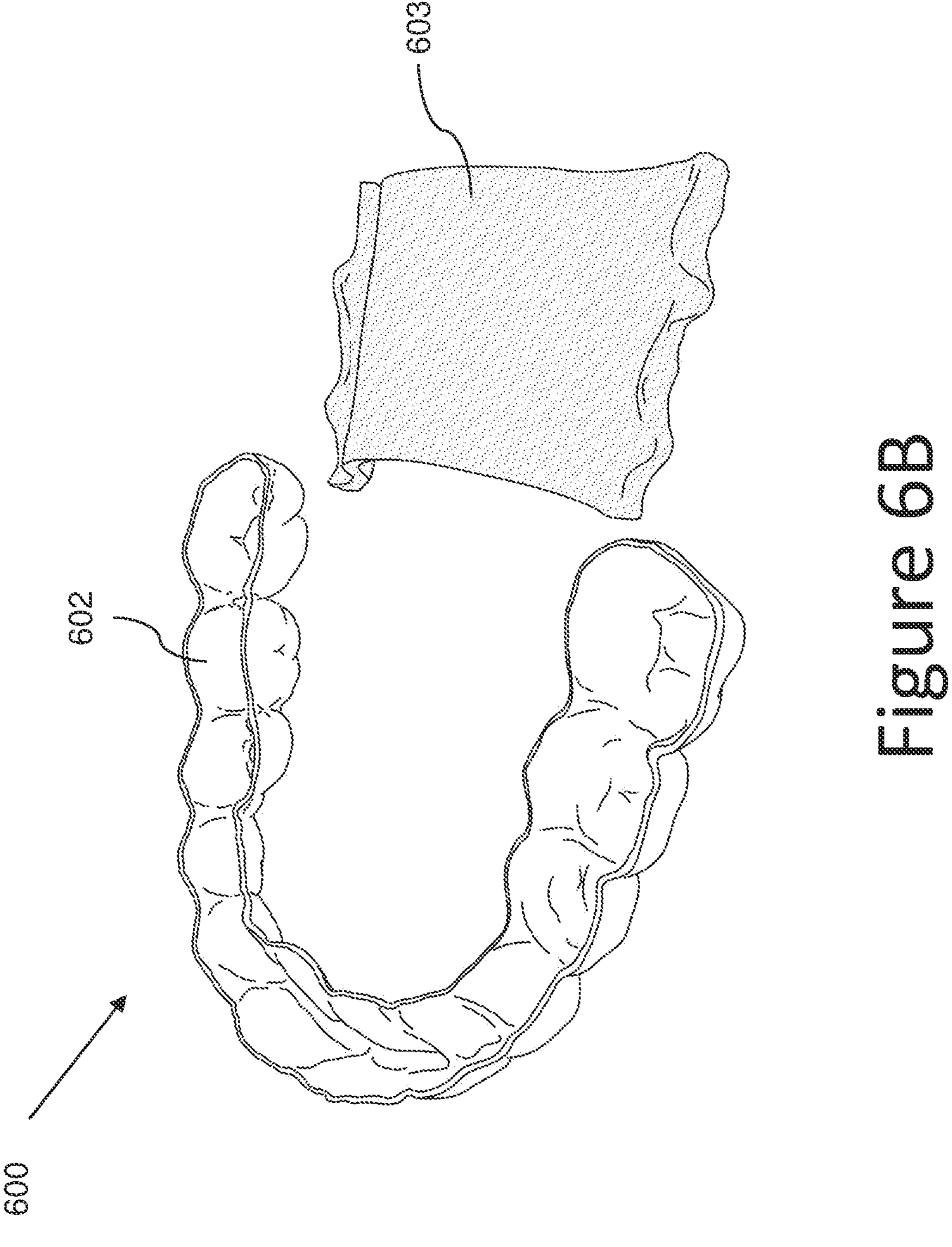
FIG. 6B illustrates an example of an appliance having a removable arch element according to a number of embodiments of the present disclosure.

FIGS. 6A and 6B illustrate an example of an appliance having a removable arch element according to a number of embodiments of the present disclosure. In the embodiments of FIGS. 6A and 6B, the appliance 600 has a shell 602 with a mounting element 610 (as shown in FIG. 6A) thereon to engage the arch element 604.

The mounting element and arch element can be affixed together by any suitable mechanism and can be either releasably or permanently affixed together. Some examples of affixation mechanisms include, sliding a flange into a slot, placing a tab into an aperture, chemical bonding, adhesive bonding, among many other affixation mechanisms. In the embodiment of FIG. 6A, the edges of the arch element that will be adjacent to the shell can be slid into a notch or channel formed in the shell (the embodiment of FIG. 6A has a raised channel formed therein). This engagement can be mechanically fixed (by a locking mechanism or frictional engagement or by bonding the two parts together chemically or with an adhesive.

In the embodiment of FIG. 6B, an arch element 603 is attached to a shell 602 to form an appliance 600. In this embodiment, the arch element 603 is formed from a material different than that of shell 602.

Materials having different characteristics can be added or in some embodiments, one arch element can be interchanged with another. For example, if it is desired that the arch element be more rigid than the shell, then a more rigid material may be used (as in this embodiment) or added as a layer (to an arch element of one or more other materials, such as that of FIG. 6A or FIG. 9) to add rigidity to the arch element. In another embodiment, the arch portion of the appliance may already have rigidity, but may lose its rigidity over time, so an arch element of a different material can be added to provide resiliency which may extend the period in which the original arch material may be usable for its purpose.

In various embodiments, a first arch element can be used and then a second arch element having a different characteristic may be affixed in place of the first arch element. For example, an arch element having a first force providing physical characteristic may be utilized and then that arch element may be removed from the appliance and replaced by an arch element having a second force providing characteristic. This can be beneficial in embodiments where the shell can be reused from one phase of treatment to another and as such, the arch element can be replaced rather than an entirely new appliance having to be fabricated and used. The different characteristic can be different from one or both of the shell and/or the first arch element. Examples of different physical characteristics include: rigidity, resiliency, color, and thickness profile (thickness at any point along the second arch element maybe different than the thickness at a corresponding point on the first arch element).

In some embodiments, the arch element can be removed and the appliance can continue to be worn in the patient's mouth without the arch element. In such embodiments, the appliance can, for example, continue to maintain the position of one or more teeth and/or can continue to adjust the positon and/or orientation of one or more teeth.

FIG. 7 illustrates an example of an appliance having an anterior tab arch element according to a number of embodiments of the present disclosure. FIG. 7 provides an appliance 700 having a shell 702 with a tab 705 thereon to provide additional rigidity and/or palate expansion force. The anterior tab 705 is a small tab on lingual side of arch. It may be used to increase structural integrity of the appliance in the transverse direction between the two ends of the jaw. In some embodiments, lingual tab feature may run along one or more portions of or the entire span of arch. The cross sectional geometry of the lingual tab can be varied uniformly or non-uniformly along its length to provide additional rigidity and/or force to adjust the palate.

Figure 8:
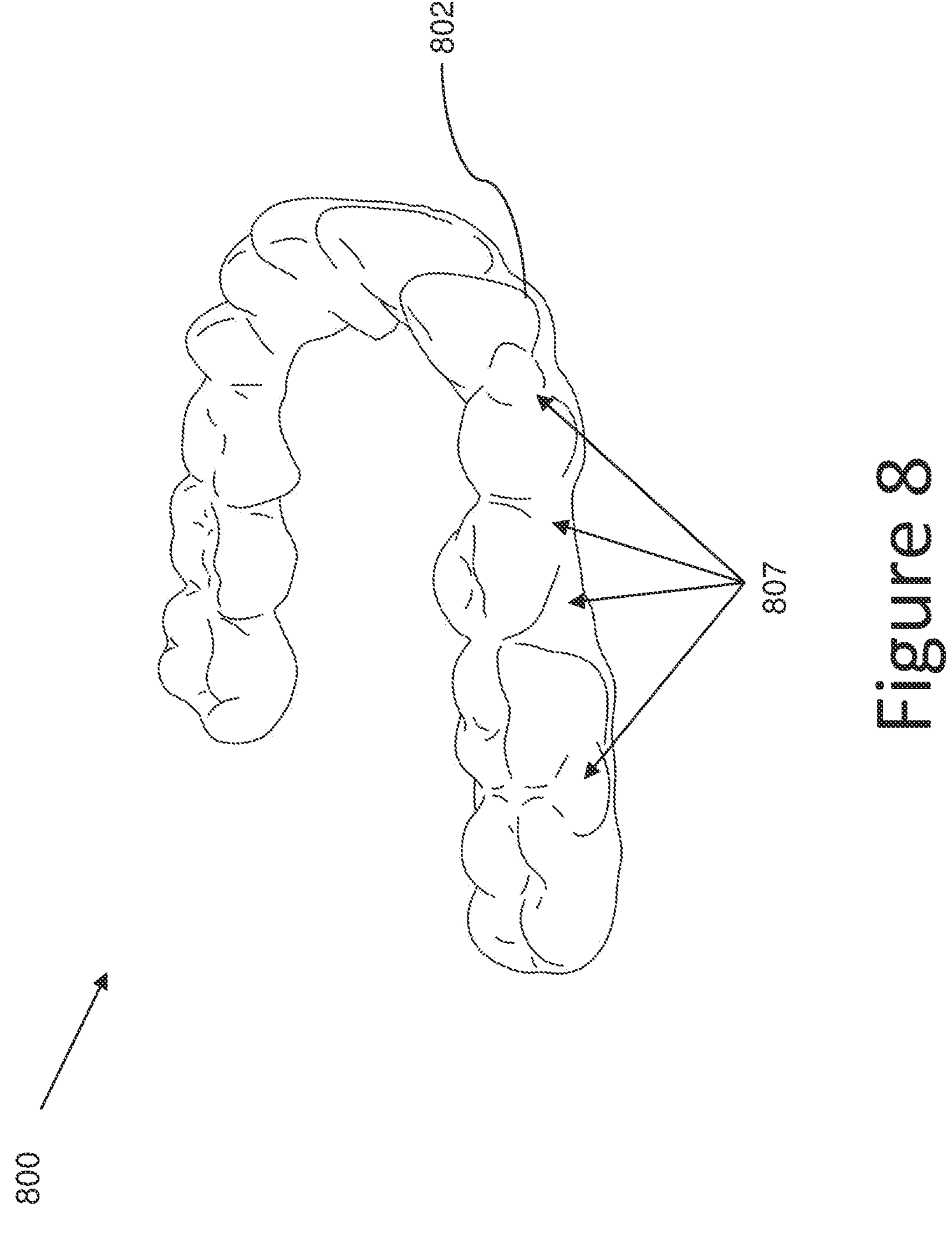
FIG. 8 illustrates an example of an appliance having a rib feature according to a number of embodiments of the present disclosure.

FIG. 8 illustrates an example of an appliance having a rib feature according to a number of embodiments of the present disclosure. FIG. 8 provides an appliance 800 that has one or more rib features 807 on the surface of the shell 802. These features are areas that are thicker than other portions of the appliance body thickness and therefore provide addition rigidity and/or force.

Additionally, the ribs are elongate shapes that can be oriented in different directions along the surface of the shell 802. This enables them to provide forces in specialized directions to precision the forces provided to the teeth from the appliance. In the illustrated embodiment, of FIG. 8, the ribs have been thermoformed in a particular geometry (planned through the aid of the executable instructions in the computing device) to provide added rigidity to the posterior section of the dental appliance.

For example, in some embodiments, a rib feature can be positioned in the buccal and/or lingual sections between the cavities for the crowns to strengthen the appliance in the transverse direction, so individual teeth can be moved as a segment. In a mixed dentition case, if a primary tooth is lost during treatment, such an embodiment can help preserve the palatal expansion force, since the posterior section is being expanded as a segment.

FIG. 9 illustrates an example of an appliance having an arch element connecting the posterior sides of the arch according to a number of embodiments of the present disclosure. In the embodiment of FIG. 9, the appliance 900 includes a shell 902 with an arch element 904 spanning across the palate. In this embodiment, the arch element 904 does not cover the entire palate of the patient, but rather, spans a portion of the palate and leaving a portion uncovered. Such an embodiment may be more comfortable for the patient and may be easier to place and remove, among other benefits.

FIG. 10 illustrates an example of an appliance having a full palatal arch element according to a number of embodiments of the present disclosure. In the embodiment of Figure the appliance 1000 includes a shell 1002 with an arch element 1004 spans the entire palate surface (in the anterior-posterior direction between the left and right jaw portions of the shell 1002. In this embodiment, the arch element 1004 spans the entire palate of the patient (up to the back edge if the back molars or the molars that are second from the back). Such an embodiment may be easier to manufacture and will reduce edges that may be uncomfortable to the patient, among other benefits.

FIG. 11 illustrates an example of an appliance having an extended gingival feature thereon according to a number of embodiments of the present disclosure. The embodiment of FIG. 11 provides an appliance 1100 including a shell 1102 having an extended gingival feature 1109 to provide additional rigidity and/or palate expansion force.

The extended gingival feature 1109 is an extension of the appliance that is contoured to follow the shape of the gingiva. This type of arch element may be used to increase structural integrity of the appliance in the transverse direction between the two ends of the jaw. In some embodiments, extended gingival feature may run along one or more portions of or the entire span of arch.

Further, the cross sectional geometry of the extended gingival feature can be varied uniformly or non-uniformly along its length to provide additional rigidity and/or force to adjust the palate. For example, the extended gingival feature can be shaped to match the contour (e.g., in two or three dimensions) of the physical gingiva upon which the extended gingival feature will be placed.

The extension of the gingival cut line at the time of manufacturing may accomplish what the anterior tab feature does by using the actual gingival surface to support the transverse force to increase the rigidity of the appliance and/or provide force to adjust the palate in the transverse direction. This feature may also help with appliance retention for short crowns found in mixed dentition cases, among other benefits.

Embodiments of the present disclosure can also provide other beneficial functions. For example, embodiments can maintain space in the patient's mouth when the patient's primary and permanent dentition have a size discrepancy.

For instance, unlike the anterior teeth, the permanent premolars may be smaller than the primary teeth they replace. On average, the mandibular primary second molar is 2 mm larger than the second premolar and, in the maxillary arch, the primary second molar is only 1.5 mm larger. The primary first molar is only 0.5 mm larger than the first premolar. Accordingly, on average, this results in 2.5 mm of space, called leeway space, in the mandibular arch and 1.5 mm in the maxillary arch. The leeway space is usually taken by mesial movement of the permanent molars (the permanent first molars move mesially relatively rapidly).

This creates an opportunity to gain arch length and relieve crowding by stopping the first molar mesial movement by, for example, using a pontic along with the appliance by filling the appliance tooth space and leaving clearance for erupting tooth. The filled pontic material can be used to keep the first molar from moving into the leeway space while allowing the permanent premolar to erupt.

Figure 12A:
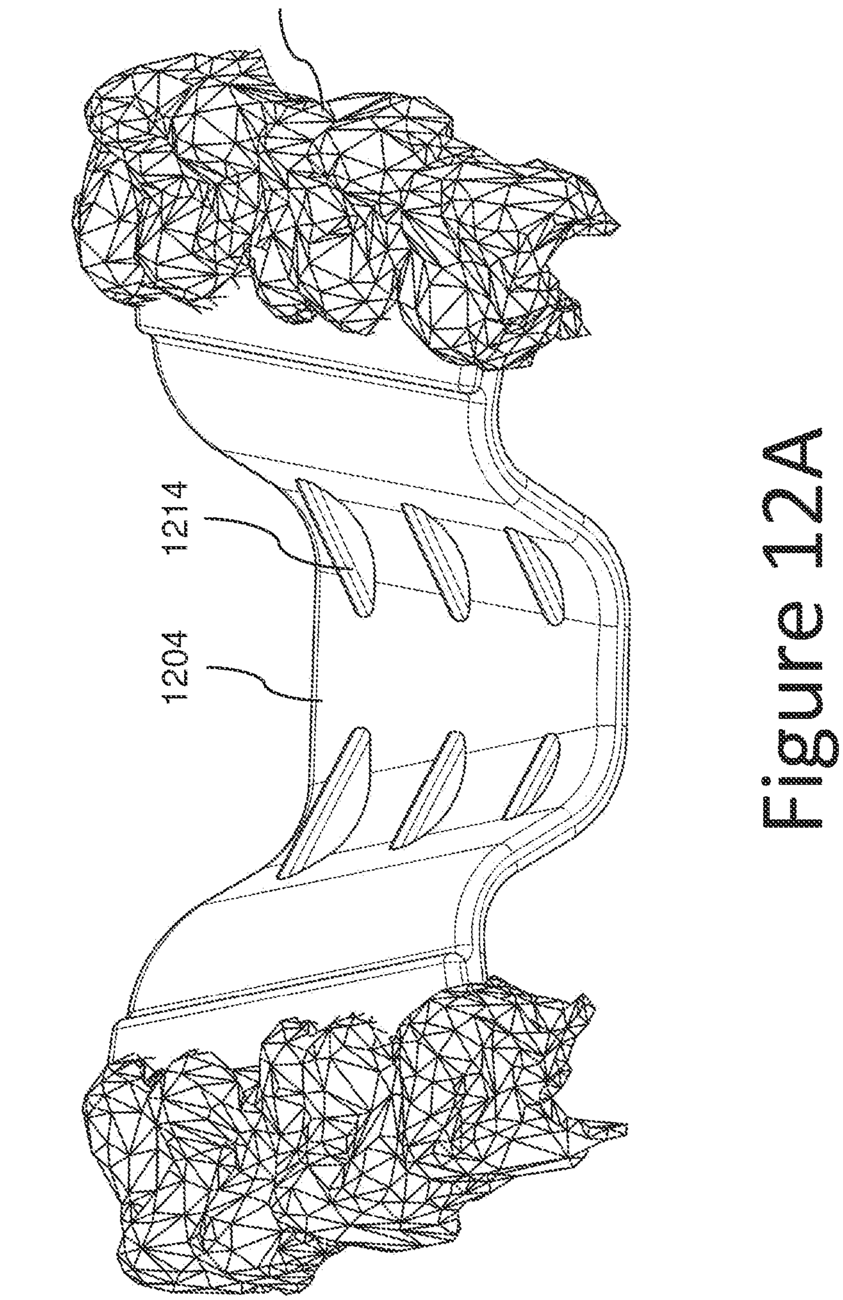
FIG. 12A illustrates an example of an appliance according to a number of embodiments of the present disclosure.
Figure 12B:
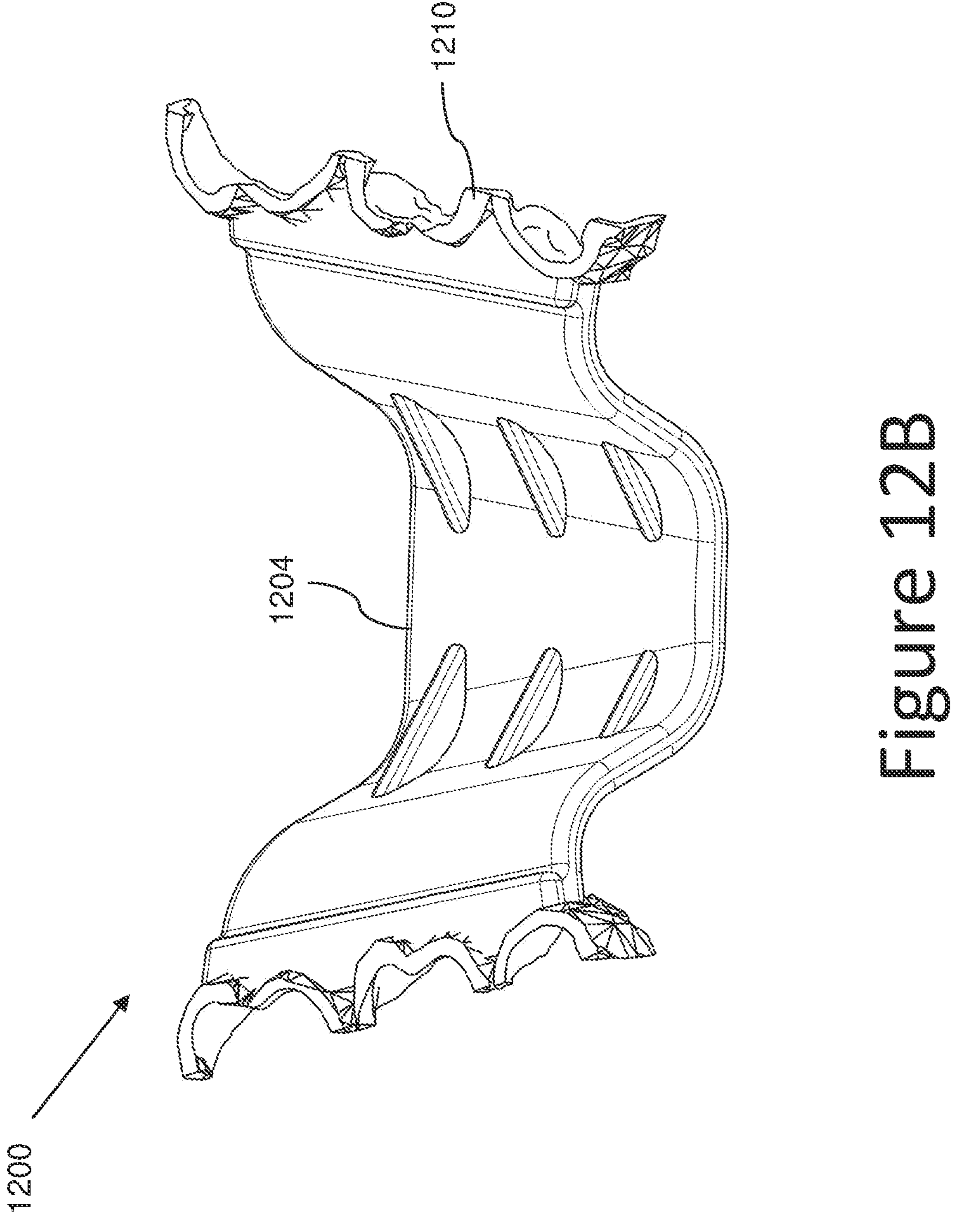
FIG. 12B illustrates an example of an appliance according to a number of embodiments of the present disclosure.
Figure 12C:
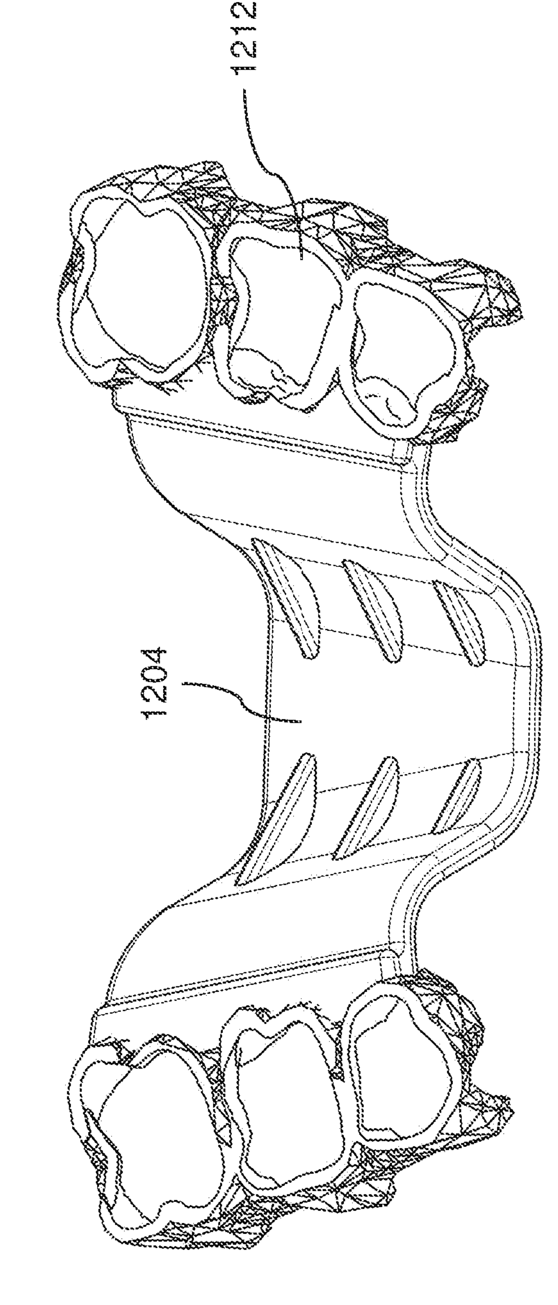
FIG. 12C illustrates an example of an appliance according to a number of embodiments of the present disclosure.

FIGS. 12A, 12B, and 12C illustrate examples of appliances according to a number of embodiments of the present disclosure. In the embodiment of FIG. 12A, an appliance 1200 has one or more tooth engagement structures, in this case, a shell 1202 with cavities, and an arch element 1204 formed thereon. Also illustrated in the embodiment of FIG. 12A are structural reinforcement features in the form of struts 1214. These features can be positioned in various places on the arch element to increase the rigidity of the arch element.

This may be a design that can be produced directly from a virtual model, through processes as discussed above, either as a single piece or as one or more shell and arch pieces that can be affixed together. In the embodiment of FIG. 12B, the appliance 1200 does not have a shell, but rather has an arch element 1204 and one or more tooth engagement structures 1210 to contact a surface of a tooth and impart force thereto.

It should be noted that in some embodiments, portions of the appliance may not be visible to people when they see the appliance in the patient's mouth and as such the material does not have to be clear, and this therefore allows for more options with regard to the choice of material that can be utilized. With some manufacturing processes, as discussed herein, the appliance can be fabricated from multiple materials or can be manufactured in parts wherein the parts are made from different materials and are attached together to create the appliance.

The tooth engagement structure may extend along a small portion of the side surfaces of the tooth or may extend substantially around the side surfaces of the tooth, as shown in FIG. 12C. In the embodiment of FIG. 12C, the tooth engagement structures 1212 extend around the entire side surfaces of the tooth to surround the tooth.

Such embodiments may provide more secure fitment of the appliance in the mouth of the patient, may be able to impart more force, and may be able to control that application of that force in one or more directions with respect to the tooth. This may, in some instances, allow the positon or orientation of a tooth to be adjusted while the appliance is expanding the palate of the patient.

In some embodiments, the appliance can be overlayed over an existing appliance used to adjust tooth positioning and/or orientation. For example, in an embodiment such as the one illustrated in FIG. 12A, the cavities 1202 can be sized to fit over cavities of an aligner appliance used for aligning one or more teeth or a retainer appliance used to maintain the position of one or more teeth. The aligner appliance and/or the arch adjustment appliance may have features thereon to lock the two appliances together or they may be affixed together by other means (e.g., frictionally and/or via adhesives, etc.).

As discussed herein, multiple piece embodiments can be potentially beneficial, for example, because they can be designed to have a removable portion. For instance, the lingual side connection feature can be affixed (e.g., thermoformed) on the surface of the appliance. A rigid piece, spanning across the palate, can be snapped into place and removed as needed. Alternatively, in some embodiments, a wire or spring can be used instead of the rigid piece.

In embodiments where the pieces are permanently affixed, a lingual side connection feature can be affixed (e.g., thermoformed) on the surface of the appliance to position a rigid piece spanning across the palate so it can be secured to an appliance (e.g., with adhesive). Alternatively, a wire or spring can be used instead of the rigid piece, in some embodiments.

In one such embodiment, the appliance includes an arch element shaped to span at least a portion of the surface of a patient's palate, wherein the arch element is designed to expand an arch of the teeth of the patient, wherein the arch element has a width specific to a stage of a treatment plan and one or more tooth engagement structures and wherein each structure contacts at least one of a surface of a tooth or a surface of the patient's gingiva and imparts a force thereto. In some such embodiments, one or more tooth engagement structures is a removable shell having a number of cavities formed therein, wherein the number of cavities are shaped to receive teeth of a patient.

As shown in FIG. 12B, the tooth engagement structure can extend along a portion of at least one side surface of a tooth. Further, in the embodiments of FIGS. 12A and 12C, the tooth engagement structure can extend substantially around the side surfaces of the tooth (in the embodiments of FIGS. 12A and 12C it extends all the way around) to surround the tooth.

Although the discussion above is focused on arch expansion, in some instances the arch will need to be contracted and embodiments of the present disclosure can be utilized for arch contraction cases as well. For example, in a method embodiment, the method can include a method of forming a dental appliance, including forming a first virtual arch element using physical data of a palate and a number of teeth of a patient, wherein the arch element is narrower than an arch width of the number of teeth of a first jaw of the patient, specific to a stage of a treatment plan, forming one or more virtual tooth engagement structures connected to the arch element and wherein each structure contacts a surface of a virtual tooth and imparts a virtual force thereto. In various embodiments such as those illustrated in the Figures, the tooth engagement structure can be constructed and arranged to impart force to move the tooth either positionally or orientationally or both while the appliance is adjusting (i.e., expanding or contracting) the palate of the patient.

Other benefits of embodiments of the present disclosure can include, but are not limited to: arch form control wherein the appliance has structural integrity to modify or control mandible or maxilla shape. The use of an upper and lower appliance set allows for alignment of the arch shape in either or both arches. Embodiments can also provide structural integrity to enhance and control growth as a patient matures, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of forming a dental appliance, comprising:

forming a virtual arch element using a virtual dental arch of a patient, the virtual dental arch including a palate and a number of teeth of the patient's jaw, wherein the virtual arch element is wider than an arch width across the virtual dental arch; and forming one or more virtual tooth engagement structures connected to the virtual arch element, wherein the one or more virtual tooth engagement structures is configured to engage with teeth on opposing sides of the virtual dental arch, wherein the virtual arch element extends from a lingual side of the one or more virtual tooth engagement structures so that, when the one or more virtual tooth engagement structures are engaged with the teeth on opposing sides of the virtual dental arch, the virtual arch element spans across the palate and the virtual arch element and the one or more virtual tooth engagement structures applies a virtual force on the teeth on opposing sides of the virtual dental arch in accordance with a stage of a treatment plan.

2. The method of claim 1, wherein forming the one or more virtual tooth engagement structures includes forming a removable shell that includes a number of cavities formed therein, wherein the number of cavities are shaped to each receive one or more teeth of the virtual dental arch.

3. The method of claim 1, wherein the virtual arch element is a first virtual arch element, the method further including forming a second virtual arch element using the virtual dental arch of the patient, wherein the second virtual arch element is configured to replace the first virtual arch element and is shaped to impart a second virtual force on the teeth on opposing sides of the virtual dental arch according to a second stage of the treatment plan, wherein the second virtual arch element is wider than the first virtual arch element as measured in a lingual direction across the palate.

4. The method of claim 1, wherein the virtual arch element is a first virtual arch element and the one or more virtual tooth engagement structures is a first one or more virtual tooth engagement structures, the method further including:

forming a second virtual arch element using the virtual dental arch of the patient, wherein the second virtual arch element is shaped to impart a second virtual force on the teeth on opposing sides of the virtual dental arch according to a second stage of the treatment plan, wherein the second virtual arch element is wider than the first virtual arch element as measured in a lingual direction across the palate; and forming a second one or more virtual tooth engagement structures connected to the second virtual arch element using the virtual dental arch of the patient, wherein the second one or more virtual tooth engagement structures are shaped to move at least one of a number of teeth of the virtual dental arch according to the second stage of the treatment plan.

5. The method of claim 4, further including, prior to forming the second one or more virtual tooth engagement structures that move the at least one of the number of teeth according to the second stage of the treatment plan, calculating a location of the at least one of the number of teeth based upon a movement of an arch of the patient accomplished by one or more estimated forces applied by the first virtual arch element and the first one or more virtual tooth engagement structures.

6. The method of claim 5, further including wherein the method further includes defining a space between two virtual teeth or a virtual tooth and another feature of a patient's mouth based upon a calculated movement of the arch of the patient accomplished by the virtual force applied by the first virtual arch element and the first one or more virtual tooth engagement structures and designing the second one or more virtual tooth engagement structures to maintain the defined space.

7. The method of claim 1, further including forming a physical arch element based on the virtual arch element, and forming one or more physical tooth engagement structures connected to the physical arch element.

8. The method of claim 1, wherein the virtual arch element is releasably connectable to the one or more virtual tooth engagement structures via a mounting element.

9. The method of claim 1, wherein forming the virtual arch element includes calculating movement of the number of teeth accomplished by the applied virtual force.

10. The method of claim 1, wherein forming the one or more virtual tooth engagement structures comprises shaping the one or more virtual tooth engagement structures to apply virtual straightening forces on one or more virtual teeth of the virtual dental arch to correct tooth misalignment.

11. The method of claim 1, further comprising forming the dental appliance having an arch element and one or more tooth engagement structures corresponding to the virtual arch element and the virtual tooth engagement structures.

12. The method of claim 11, wherein the arch element and the one or more tooth engagement structures are made of a same material.

13. The method of claim 1, wherein forming the one or more virtual tooth engagement structures comprises forming a mounting element on the one or more virtual tooth engagement structures, the mounting element configured to engage with the virtual arch element to couple the virtual arch element with the one or more virtual tooth engagement structures.

14. The method of claim 1, wherein the virtual force ranges from 3 N to 9 N.

15. A method of forming a dental appliance, comprising:

forming a virtual arch element based on a virtual dental arch of a patient, wherein the virtual arch element is wider than an arch width across a palate of the virtual dental arch;

forming one or more virtual tooth engagement structures connected to the virtual arch element and configured to engage with teeth on opposing sides of the virtual dental arch, wherein the virtual arch element extends from a lingual side of the one or more virtual tooth engagement structures so that, when the one or more virtual tooth engagement structures are engaged with the teeth on opposing sides of the virtual dental arch, the virtual arch element spans across the palate and the virtual arch element and the one or more virtual tooth engagement structures applies a virtual force on the teeth on opposing sides of the virtual dental arch in accordance with a stage of a treatment plan; and fabricating the dental appliance by forming a physical arch element based on the virtual arch element and one or more physical tooth engagement structures based on the one or more virtual tooth engagement structures.

16. The method of claim 15, wherein forming the one or more virtual tooth engagement structures includes forming a shell that includes a number of cavities formed therein, wherein the number of cavities are shaped in accordance with one or more teeth of the virtual dental arch.

17. The method of claim 15, further comprising forming a second virtual arch element based on the virtual dental arch, wherein the second virtual arch element imparts a second virtual force to the virtual dental arch across the palate according to a second stage of the treatment plan.

18. The method of claim 15, wherein the virtual force is based on maintaining a predefined space between two teeth of the virtual dental arch or a virtual tooth and another feature of the virtual dental arch.

19. The method of claim 15, further comprising forming an arch element based on the virtual arch element and one or more tooth engagement structures based on the one or more virtual tooth engagement structures.

20. The method of claim 15, wherein forming the virtual arch element comprises forming a corrugated surface on the virtual arch element.

21. The method of claim 15, wherein forming the virtual arch element comprises forming the virtual arch element such that it is releasable from the one or more virtual tooth engagement structures.

22. The method of claim 15, wherein forming the virtual arch element comprises forming one or more reinforcement structures on a lingual side of the virtual arch element.

23. A method of forming a dental appliance, comprising:

defining a width of a virtual arch element to be wider than an arch width across a palate of a virtual dental arch; and forming the virtual arch element coupled to one or more virtual tooth engagement structures, the one or more virtual tooth engagement structures configured to engage with teeth on opposing sides of the virtual dental arch, wherein the virtual arch element extends from a lingual side of the one or more virtual tooth engagement structures so that, when the one or more virtual tooth engagement structures are engaged with the teeth on opposing sides of the virtual dental arch, the virtual arch element spans across the palate of the virtual dental arch and the virtual arch element and the one or more virtual tooth engagement structures imparts a virtual force across the palate of the virtual dental arch in accordance with a stage of a treatment plan.

24. The method of claim 23, wherein forming the virtual arch element comprises forming the one or more virtual tooth engagement structures to extend around to a buccal side of the virtual dental arch.

25. The method of claim 23, wherein forming the virtual arch element includes forming a corrugated surface on the virtual arch element.

* * * * *